US011428246B2

(12) United States Patent  (10) Patent No.: US 11,428,246 B2
Miyajima  (45) Date of Patent: Aug. 30, 2022

(54) STEAM VALVE DRIVING APPARATUS

(71) Applicants: KABUSHIKI KAISHA TOSHIBA, Minato-ku (JP); TOSHIBA ENERGY SYSTEMS & SOLUTIONS CORPORATION, Kawasaki (JP)

(72) Inventor: Hidekazu Miyajima, Ota (JP)

(73) Assignees: KABUSHIKI KAISHA TOSHIBA, Minato-ku (JP); TOSHIBA ENERGY SYSTEMS & SOLUTIONS CORPORATION, Kawasaki (JP)

( * ) Notice: Subject to any disclaimer, the term of this patent is extended or adjusted under 35 U.S.C. 154(b) by 304 days.

(21) Appl. No.: 16/858,882

(22) Filed: Apr. 27, 2020

(65) Prior Publication Data

US 2020/0256479 A1 Aug. 13, 2020

Related U.S. Application Data

(63) Continuation of application No. PCT/JP2019/005275, filed on Feb. 14, 2019.

(30) Foreign Application Priority Data

Feb. 26, 2018 (JP) .............................. JP2018-032368

(51) Int. Cl.
  *F15B 1/04* (2006.01)
  *F15B 1/26* (2006.01)
  (Continued)

(52) U.S. Cl.
  CPC ................ *F15B 1/04* (2013.01); *F15B 1/265* (2013.01); *F15B 15/1476* (2013.01);
  (Continued)

(58) Field of Classification Search
  CPC .... F15B 20/002; F15B 20/004; F15B 20/007; F15B 20/008; F15B 1/04–24;
  (Continued)

(56) References Cited

U.S. PATENT DOCUMENTS 389,643 A * 9/1888 Dixon ..................... B60T 15/42
  251/63.4
2,489,450 A * 11/1949 Crookston .............. F16D 65/28
  137/635

(Continued)

FOREIGN PATENT DOCUMENTS

JP  49-027703 A  3/1974
JP  56-002406 A  1/1981
  (Continued)

OTHER PUBLICATIONS

International Search Report dated May 7, 2019 in PCT/JP2019/005275 filed on Feb. 14, 2019, 1 page.

*Primary Examiner* — William M McCalister
(74) *Attorney, Agent, or Firm* — Maier & Maier, PLLC

(57) ABSTRACT

In a steam valve driving apparatus according to an embodiment, a control valve permits or blocks a flow of hydraulic oil from a supply port to an opening direction piston chamber. A dump valve blocks or permits the flow of the hydraulic oil from the opening direction piston chamber to a discharge port. A blocking valve permits or blocks a flow of the hydraulic oil from an accumulator to a closing direction piston chamber. The control valve permits the flow of control oil from the closing direction piston chamber to the discharge port in a state where the flow of hydraulic oil from the supply port to the opening direction piston chamber is permitted.

16 Claims, 22 Drawing Sheets

(51) Int. Cl.
*F16K 31/00* (2006.01)
*F16K 31/122* (2006.01)
*F15B 15/14* (2006.01)
*F15B 21/00* (2006.01)
*F15B 20/00* (2006.01)

(52) U.S. Cl.
CPC .......... F15B 20/004 (2013.01); F15B 20/007 (2013.01); F15B 20/008 (2013.01); F16K 31/001 (2013.01); F16K 31/1221 (2013.01); *F05D 2220/31* (2013.01); *F15B 20/002* (2013.01); *F15B 21/005* (2013.01); *F15B 2211/212* (2013.01); *F15B 2211/30505* (2013.01); *F15B 2211/31558* (2013.01); *F15B 2211/8623* (2013.01); *F15B 2211/8633* (2013.01)

(58) Field of Classification Search
CPC .......... F15B 15/1476; F15B 2211/8623; F15B 2211/8633; F15B 2211/212; F15B 2211/32558; Y10T 137/87177; Y10T 137/87201; Y10T 137/87209
USPC ............ 137/596.12, 596.15, 596.16; 91/521, 91/522, 523, 530, 531; 251/63.4
See application file for complete search history.

(56) References Cited

U.S. PATENT DOCUMENTS

| | | | | |
|---|---|---|---|---|
| 2,861,550 | A * | 11/1958 | Hanna | F15B 13/0438 91/454 |
| 2,913,876 | A * | 11/1959 | Reid | F15B 11/16 296/117 |
| 3,038,500 | A * | 6/1962 | Lansky | F15B 13/0431 251/30.05 |
| 3,237,641 | A * | 3/1966 | Audemar | F16H 61/0274 91/40 |
| 3,272,062 | A * | 9/1966 | Flippo | F15B 18/00 92/28 |
| 3,482,398 | A * | 12/1969 | Christensen | B62D 5/32 91/509 |
| 3,705,631 | A * | 12/1972 | Seaberg | E02F 3/844 91/518 |
| 4,567,813 | A * | 2/1986 | Garnjost | F15B 18/00 91/509 |
| 4,611,528 | A * | 9/1986 | Nanda | F15B 13/02 91/461 |
| 4,744,285 | A * | 5/1988 | Presley | F15B 11/20 91/534 |
| 4,909,279 | A * | 3/1990 | Nakamura | B66B 1/24 91/452 |
| 4,986,165 | A * | 1/1991 | Miyaoka | F15B 13/0422 91/522 |
| 5,044,256 | A * | 9/1991 | Budzich | E02F 9/226 137/596.1 |
| 5,081,903 | A * | 1/1992 | Wardle | F15B 13/07 137/627 |
| 5,088,383 | A * | 2/1992 | Wardle | F15B 13/07 137/83 |
| 5,280,807 | A * | 1/1994 | Frey | F01D 21/18 251/30.01 |
| 7,356,990 | B2 | 4/2008 | Burdick et al. | |
| 8,753,067 | B2 | 6/2014 | Shindo | |
| 9,528,534 | B2 | 12/2016 | Finke et al. | |
| 2010/0243927 | A1* | 9/2010 | Wahlefeld | F15B 13/0431 251/57 |
| 2012/0091373 | A1* | 4/2012 | Shindo | F01D 17/145 251/12 |
| 2014/0026747 | A1* | 1/2014 | Finke | F15B 20/008 91/160 |

FOREIGN PATENT DOCUMENTS

| | | |
|---|---|---|
| JP | 63-156401 U | 10/1988 |
| JP | 08-165905 A | 6/1996 |
| JP | 2000-064811 A | 2/2000 |
| JP | 2003-056306 A | 2/2003 |
| JP | 2007-064481 A | 3/2007 |
| JP | 2012-082795 A | 4/2012 |
| JP | 2013-543957 A | 12/2013 |

* cited by examiner

STEAM VALVE DRIVING APPARATUS

CROSS-REFERENCE TO RELATED APPLICATIONS

This application is a continuation of International Application No. PCT/JP2019/005275, filed on Feb. 14, 2019 based upon and claims the benefit of priority from Japanese Patent Application No. 2018-032368, filed Feb. 26, 2018; the entire contents of which are incorporated herein by reference.

FIELD

Embodiments described herein generally relate to a steam valve driving apparatus.

BACKGROUND

A steam valve that controls the supply of steam to a steam turbine is driven to open and close by a steam valve driving apparatus. Such a steam valve driving apparatus needs to include not only a function for performing speed control and load control of the turbine, but also a fail-safe function for safely stopping the turbine when control is lost. In order to provide a fail-safe function, a known steam valve driving apparatus includes a closing spring that constantly applies a biasing force (spring force) acting as a load to a valve body of the steam valve in the closing direction of the steam valve.

A typical steam valve driving apparatus having such a closing spring will be described with reference to FIGS. 21 and 22. A cylinder 100 in the steam valve driving apparatus illustrated in FIGS. 21 and 22 includes: a piston 101; a piston chamber 102 to which control oil for pressing the piston 101 in the opening direction is supplied; and a closing spring 103. The closing spring 103 biases the piston 101 in the closing direction of a steam valve SV. This biasing force is constantly applied as a load regardless of the open/close state.

As illustrated in FIG. 21, the control oil is supplied to the piston chamber 102 of the cylinder 100 via the servo valve 104 so that the piston 101 is pressed in the opening direction by the control oil. The piston chamber 102 is connected with an A-port of a dump valve 105, with an X-port of the dump valve 105 connected to a trip solenoid valve 106. In the case of resetting the steam valve SV (opening the steam valve SV), the trip solenoid valve 106 is energized, and emergency oil is supplied to the X-port of the dump valve 105 via the trip solenoid valve 106, leading to a closed state of the dump valve 105. In the case of tripping the steam valve SV (rapidly closing the steam valve SV), the trip solenoid valve 106 is de-energized and this causes the emergency oil in the X-port of the dump valve 105 to be discharged, as illustrated in FIG. 22. As a result, the dump valve 105 is opened, and the control oil in the piston chamber 102 is discharged via the B-port of the dump valve 105. Therefore, the piston 101 moves in the closing direction by the biasing force of the closing spring 103, causing the steam valve SV to be rapidly closed.

In this manner, the control oil supplied to the piston chamber 102 presses the piston 101 in the opening direction. In contrast, the piston 101 is pressed in the closing direction by the closing spring 103 provided in the cylinder 100, not by the control oil. The cylinder 100 of such a steam valve driving apparatus is sometimes referred to as a single-acting type because the piston 101 is driven in one direction (opening direction of the steam valve) by hydraulic pressure.

In general, increasing an output of a turbine generator joined to a steam turbine would also increase the flow rate of steam supplied to the steam turbine. This increases the valve diameter of the steam valve and increases the spring force required for the closing spring. In this case, since the biasing force of the closing spring is constantly applied as a load to the piston. Accordingly, in order to counter the biasing force, the volume of the cylinder of the steam valve driving apparatus increases, leading to enlargement of the cylinder.

In the case of rapidly closing the steam valve in an emergency, it is necessary to rapidly discharge the control oil in the cylinder. However, as described above, there is a problem that an increase in the cylinder volume prolongs the time for discharging the control oil in the cylinder. In this case, the overspeed characteristic of the steam turbine might be deteriorated. Such a problem is considered to be caused by the fact that the biasing force of the closing spring for providing the fail-safe function is constantly applied as a load to the piston. For this reason, it is desired to provide a steam valve driving apparatus that would not cause the force for exerting the fail-safe function to be applied as a load to the piston other than in emergency (that is, in a case where the steam valve is open).

DETAILED DESCRIPTION

Figure 1:
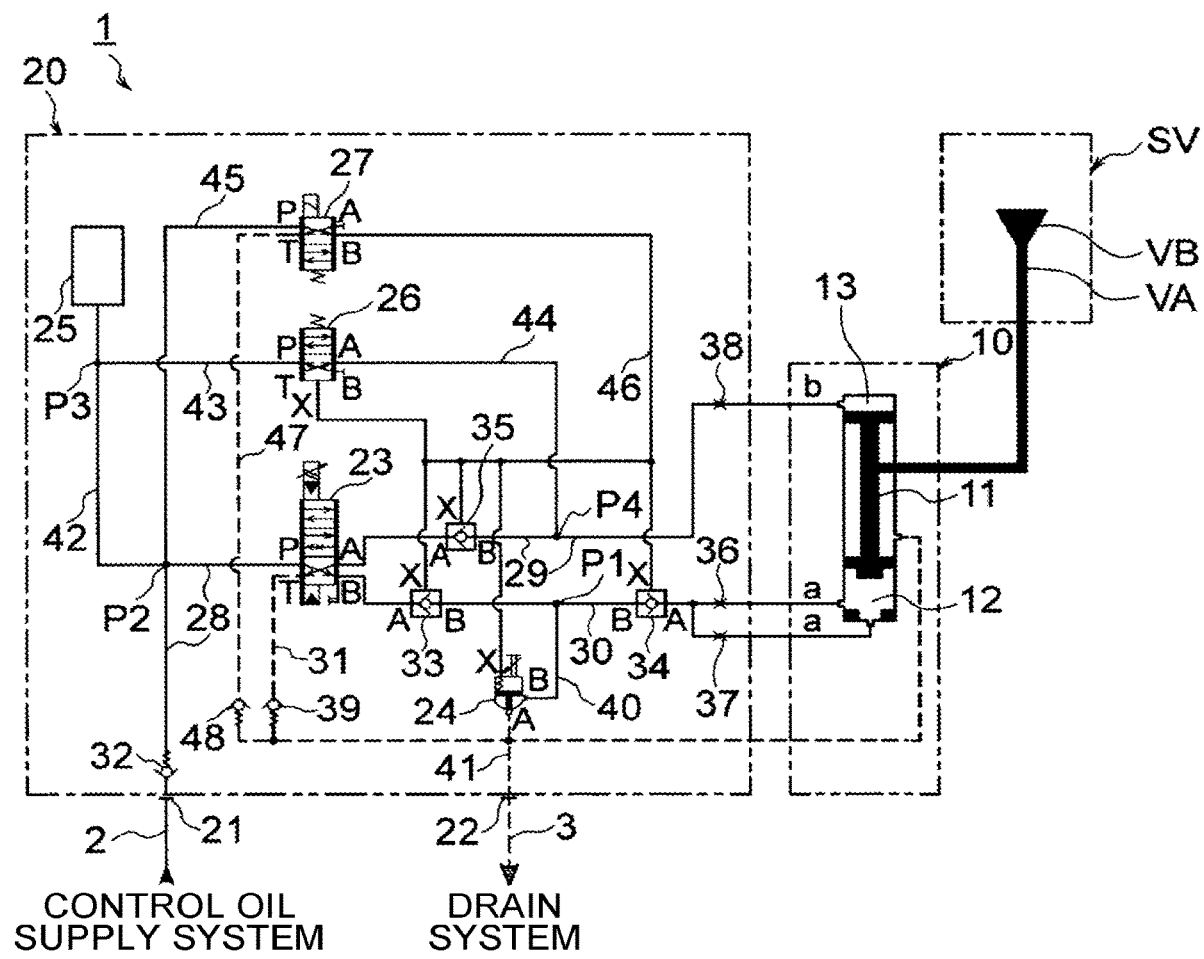
FIG. 1 is a system diagram illustrating a steam valve driving apparatus at the time of resetting a steam valve in a first embodiment.

A steam valve driving apparatus according to an embodiment is a steam valve driving apparatus regulating open and close position of a steam valve. The steam valve driving apparatus includes a supply port configured to supply hydraulic oil, a discharge port configured to discharge hydraulic oil, and a cylinder. The cylinder includes: a piston joined to a steam valve; an opening direction piston chamber to which hydraulic oil that presses the piston in the opening direction of the steam valve is supplied; and a closing direction piston chamber to which hydraulic oil for pressing the piston in the closing direction of the steam valve is supplied. The steam valve driving apparatus includes a control valve, a dump valve, an accumulator, a blocking valve, and a trip solenoid valve. The control valve is configured to permit or block the flow of hydraulic oil from the supply port to the opening direction piston chamber. The dump valve is configured to block or permit the flow of hydraulic oil from the opening direction piston chamber to the discharge port. The accumulator is configured to store hydraulic oil under pressure. The blocking valve is configured to permit or block the flow of hydraulic oil from the accumulator to the closing direction piston chamber. The trip solenoid valve is configured to control the dump valve and the blocking valve. The control valve is configured to permit the flow of control oil from the closing direction piston chamber to the discharge port in a state where the flow of hydraulic oil from the supply port to the opening direction piston chamber is permitted.

The steam valve driving apparatus according to an embodiment is a steam valve driving apparatus regulating open and close position of a steam valve. The steam valve driving apparatus includes a supply port configured to supply hydraulic oil, a discharge port configured to discharge hydraulic oil, and a cylinder. The cylinder includes: a first piston joined to a steam valve; an opening direction first piston chamber to which hydraulic oil that presses the first piston in an opening direction of the steam valve is supplied; a second piston releasably arranged with respect to the steam valve; an opening direction second piston chamber to which hydraulic oil for pressing the second piston in a steam valve opening direction is supplied; and a closing direction second piston chamber that presses the second piston in a steam valve closing direction. The steam valve driving apparatus includes a control valve, a first dump valve, a trip solenoid valve, and a second dump valve. The control valve is configured to permit or block the flow of hydraulic oil from the supply port to the opening direction first piston chamber. The first dump valve is configured to block or permit the flow of hydraulic oil from the opening direction first piston chamber to the discharge port. The trip solenoid valve is configured to permit or block the flow of hydraulic oil from the supply port to the opening direction second piston chamber. The second dump valve is configured to block or permit the flow of hydraulic oil from the opening direction second piston chamber to the discharge port. The second piston is joined to the steam valve in the case of closing the steam valve, and is separated from the steam valve in the case of opening the steam valve.

Hereinafter, a steam valve driving apparatus according to embodiments of the present invention will be described with reference to the drawings.

First Embodiment

A steam valve driving apparatus 1 in a first embodiment will be described with reference to FIGS. 1 and 2. The steam valve driving apparatus 1 illustrated here is a hydraulic driving apparatus that performs opening and closing drive of a valve body VB of a steam valve SV.

As illustrated in FIG. 1, the steam valve driving apparatus 1 according to the present embodiment includes a cylinder 10, and a manifold block 20 that supplies control oil (hydraulic oil) to the cylinder 10.

The cylinder 10 includes a piston 11 joined to the valve body VB, an opening direction piston chamber 12 to which control oil for pressing the piston 11 in the opening direction of the valve body VB is supplied, and a closing direction piston chamber 13 to which control oil to press the piston 11 in the closing direction of the valve body VB is supplied. The opening direction piston chamber 12, among these, has two a-ports. It is configured such that control oil flows into the opening direction piston chamber 12 from each of the a-ports, and control oil in the opening direction piston chamber 12 flows out from each of the a-ports. The closing direction piston chamber 13 has a b-port. It is configured such that control oil flows into the closing direction piston chamber 13 from the b-port, and control oil in the closing direction piston chamber 13 flows out from the b-port.

The piston 11 is joined to the valve body VB via a valve rod VA, and moves linearly in accordance with the pressure of the control oil in the opening direction piston chamber 12 and the pressure of the control oil in the closing direction piston chamber 13, so as to drive the valve body VB. In the configuration illustrated in FIG. 1, the opening direction of the valve body VB corresponds to an upward direction, while the closing direction of the valve body VB corresponds to a downward direction. With this configuration, when control oil is supplied to the opening direction piston chamber 12 of the cylinder 10, the piston 11 moves upward under the pressure of the control oil, and moves the valve body VB in the opening direction. In contrast, when the control oil is supplied to the closing direction piston chamber 13 of the cylinder 10, the piston 11 moves downward under the pressure of the control oil, and moves the valve body VB in the closing direction. In this manner, the cylinder 10 according to the present embodiment is sometimes referred to as a double-acting type because the piston 11 is driven in both directions (opening direction and closing direction of the steam valve SV) by hydraulic pressure.

The manifold block 20 includes: a supply port 21 that supplies control oil; and a discharge port 22 that discharges control oil. The supply port 21, among these, is connected to a control oil supply system via a control oil supply pipe 2, and the control oil is to be supplied to the supply port 21 from this control oil supply system. The discharge port 22 is connected to the drain system via a drain pipe 3, and the control oil discharged from the discharge port 22 is supplied to the drain system.

The manifold block 20 further includes a servo valve 23 (control valve), a dump valve 24, an accumulator 25, a blocking valve 26, and a trip solenoid valve 27.

The servo valve 23 is configured to be switchable between a state permitting the flow of the control oil from the supply port 21 to the opening direction piston chamber 12 and a state blocking the flow of the control oil (to permit or block the flow of the control oil). The servo valve 23 is configured to be switchable between a state permitting the flow of control oil from the closing direction piston chamber 13 to the discharge port 22 and a state blocking the flow of control oil (to permit or block the flow of the control oil). The servo valve 23 in the present embodiment has a configuration in which the flow of the control oil from the closing direction piston chamber 13 to the discharge port 22 is permitted in a state where the flow of control oil from the supply port 21 to the opening direction piston chamber 12 is permitted. In contrast, the servo valve 23 has a configuration in which the flow of the control oil from the closing direction piston chamber 13 to the discharge port 22 is blocked in a state where the flow of control oil from the supply port 21 to the opening direction piston chamber 12 is blocked.

More specifically, the servo valve 23 has a configuration in which the P-port of the servo valve 23 and the supply port 21 are connected by a first control oil supply path 28 (hydraulic oil supply path). In addition, the A-port of the servo valve 23 and the b-port of the closing direction piston chamber 13 are connected by a first closed-side channel 29, while the B-port of the servo valve 23 and the a-port of the opening direction piston chamber 12 are connected by an open-side channel 30. A T-port of the servo valve 23 is connected to a servo discharge path 31. The servo discharge path 31 merges a dump discharge path 41 described below, and is connected to the discharge port 22 via the dump discharge path 41.

The servo valve 23 is configured such that, when a first electrical signal (electrical command in the opening direction) transmitted from a control device (not illustrated) is input to a coil, the P-port and B-port of the servo valve 23 communicate with each other, so as to permit the flow of control oil from the first control oil supply path 28 to the open-side channel 30. With this configuration, the control oil is supplied from the first control oil supply path 28 to the open-side channel 30 via the P-port and B-port of the servo valve 23. In addition, an input of the first electrical signal causes the A-port and the T-port of the servo valve 23 to communicate with each other, so as to permit the flow of control oil from the first closed-side channel 29 to the servo discharge path 31. With this configuration, the control oil is supplied from the first closed-side channel 29 to the servo discharge path 31 via the A-port and T-port of the servo valve 23. The control oil supplied to the servo discharge path 31 is then supplied to the discharge port 22 via the dump discharge path 41, and discharged from the discharge port 22.

Figure 2:
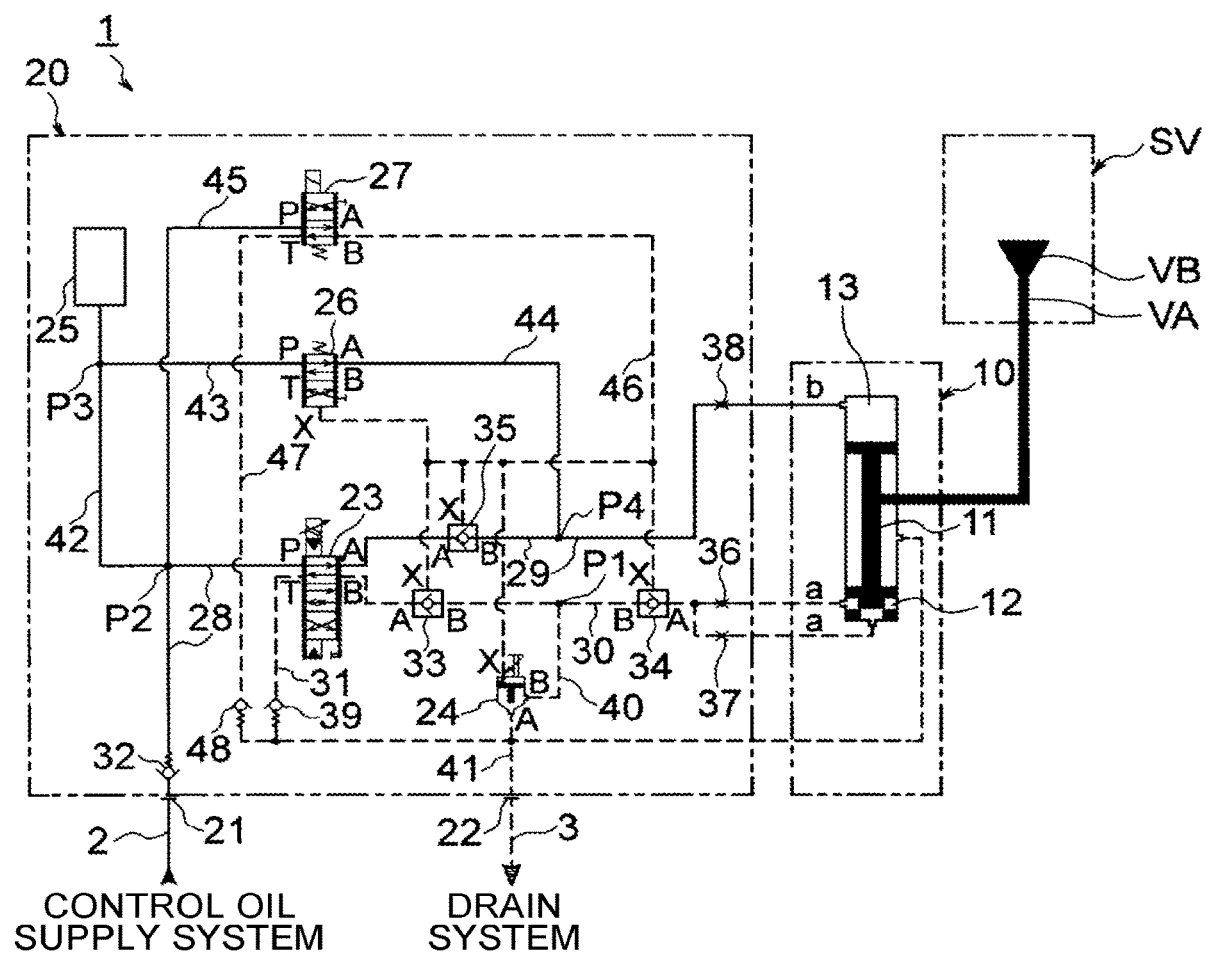
FIG. 2 is a system diagram at the time of trip of the steam valve in the steam valve driving apparatus of FIG. 1.

Meanwhile, when a second electrical signal (electrical command in the closing direction) transmitted from the control device is input to a coil, the P-port and B-port of the servo valve 23 are blocked as illustrated in FIG. 2, so as to block the flow of control oil from the first control oil supply path 28 to the open-side channel 30. In addition, the A-port and the T-port are blocked, so as to block the flow of control oil from the first closed-side channel 29 to the servo discharge path 31. Instead, the P-port and the A-port communicate with each other, allowing communication between the first control oil supply path 28 and the first closed-side channel 29. This also allows communication between the B-port and the T-port, while allowing communication between the open-side channel 30 and the servo discharge path 31.

As illustrated in FIG. 1, the first control oil supply path 28 is provided with a supply port-side check valve 32 (supply port-side backflow prevention function valve). The supply port-side check valve 32 is disposed in the first control oil supply path 28 on the side closer to the supply port 21 rather than to a branch point P2 described below. The supply port-side check valve 32 is configured to permit the flow of control oil to the servo valve 23 and block the flow of control oil to the supply port 21. In addition, the cracking pressure of the supply port-side check valve 32 is set to a minimum operating pressure of the steam valve driving apparatus 1.

The open-side channel 30 is provided with a first open-side pilot check valve 33 (open-side backflow prevention valve). The first open-side pilot check valve 33 is controlled by the trip solenoid valve 27.

More specifically, the first open-side pilot check valve 33 is disposed in the open-side channel 30 on the side closer to the servo valve 23 rather than to a branch point P1 to which a below-described dump channel 40 is connected. The A-port and B-port of the first open-side pilot check valve 33 form a part of the open-side channel 30. The X-port (pilot port) of the first open-side pilot check valve 33 is connected with the B-port of the trip solenoid valve 27. In the state where emergency oil described below from the trip solenoid valve 27 is supplied to the X-port, the X-port would be pressurized by the emergency oil to cause the first open-side pilot check valve 33 to lose the backflow prevention function so as to permit the flow of control oil in both directions. In contrast, the first open-side pilot check valve 33 has a backflow prevention function in a state where emergency oil is not supplied to the X-port (emergency oil is discharged). This would permit the flow of the control oil to the opening direction piston chamber 12, while blocking the flow of control oil to the servo valve 23.

The open-side channel 30 is provided with a second open-side pilot check valve 34. The second open-side pilot check valve 34 is controlled by the trip solenoid valve 27.

More specifically, the second open-side pilot check valve 34 is disposed in the open-side channel 30 on the side closer to the opening direction piston chamber 12 rather than to the branch point P1 to which the below-described dump channel 40 is connected. The A-port and B-port of the second open-side pilot check valve 34 form a part of the open-side channel 30. The X-port (pilot port) of the second open-side pilot check valve 34 is connected with the B-port of the trip solenoid valve 27. In a state where emergency oil is supplied to the X-port, the X-port would be pressurized by the emergency oil to cause the second open-side pilot check valve 34 to lose the backflow prevention function so as to permit the flow of control oil in both directions. In contrast, the second open-side pilot check valve 34 has a backflow prevention function in a state where emergency oil is not supplied to the X-port. This would permit the flow of control oil to the branch point P1, while blocking the flow of the control oil to the opening direction piston chamber 12.

Note that the open-side channel 30 branches into two channels so as to be connected to the two a-ports of the opening direction piston chamber 12 on the side closer to the opening direction piston chamber 12 rather than to the second open-side pilot check valve 34. Each of the channels is provided with orifices 36 and 37, and the flow rate of each of the channels is adjusted.

The first closed-side channel 29 is provided with a closed-side pilot check valve 35 (closed-side backflow prevention valve). The closed-side pilot check valve 35 is controlled by the trip solenoid valve 27.

More specifically, the closed-side pilot check valve 35 is disposed in the first closed-side channel 29 on the side closer to the servo valve 23 rather than to a branch point P4 to which a second closed-side channel 44 described below is connected. The A-port and B-port of the closed-side pilot check valve 35 form a part of the first closed-side channel 29. The X-port (pilot port) of the closed-side pilot check valve 35 is connected with the B-port of the trip solenoid valve 27. In the state where emergency oil is supplied to the X-port, the X-port would be pressurized by the emergency oil to cause the closed-side pilot check valve 35 to lose the backflow prevention function so as to permit the flow of control oil in both directions. In contrast, the closed-side pilot check valve 35 has a backflow prevention function in a state where emergency oil is not supplied to the X-port. This would permit the flow of control oil to the closing direction piston chamber 13, while blocking the flow of the control oil to servo valve 23.

Note that the first closed-side channel 29 is provided with an orifice 38, thereby adjusting the flow rate of the first closed-side channel 29. The orifice 38 is disposed in the first closed-side channel 29 on the side closer to the closing direction piston chamber 13 rather than to the branch point P4 of the second closed-side channel 44 described below.

The servo discharge path 31 is provided with a check valve 39. The check valve 39 is configured to permit the flow of control oil to the discharge port 22 and block the flow of control oil or emergency oil to the servo valve 23. That is, the check valve 39 prevents the control oil discharged from the A-port of the dump valve 24 or the cylinder 10, or the emergency oil discharged from the T-port of the trip solenoid valve 27, from being supplied to the T-port of the servo valve 23.

The dump valve 24 is configured to be switchable between a state blocking the flow of control oil from the opening direction piston chamber 12 to the discharge port 22 and a state permitting the flow of control oil (to permit or block the flow of the control oil).

More specifically, the dump valve 24 has a configuration in which the B-port of the dump valve 24 and the open-side channel 30 are connected by the dump channel 40. The dump channel 40 is connected to the branch point P1 (halfway position) provided in the open-side channel 30 on the side closer to the opening direction piston chamber 12 rather than to the first open-side pilot check valve 33. This branch point P1 is disposed in the open-side channel 30 on the side closer to the servo valve 23 rather than to the second open-side pilot check valve 34. That is, the branch point P1 is disposed between the first open-side pilot check valve 33 and the second open-side pilot check valve 34. The A-port of the dump valve 24 is connected with the dump discharge path 41. The dump discharge path 41 is connected to the discharge port 22. The X-port (pilot port) of the dump valve 24 is connected to the B-port of the trip solenoid valve 27.

The dump valve 24 is controlled by the trip solenoid valve 27. That is, the dump valve 24 is configured such that, in the state where emergency oil is supplied from the B-port to the X-port of the trip solenoid valve 27, the X-port is pressurized by the emergency oil and closed, blocking the B-port and the A-port of the dump valve 24. This blocks the flow of control oil from the opening direction piston chamber 12 to the discharge port 22. In contrast, in a state where the emergency oil is not supplied to the X-port, the dump valve 24 is opened, allowing communication between the B-port and the A-port of the dump valve 24. This permits the flow of control oil from the opening direction piston chamber 12 to the discharge port 22, allowing the control oil to be supplied from the open-side channel 30 to the dump discharge path 41 via the B-port and the A-port of the dump valve 24. The control oil supplied to the dump discharge path 41 is then supplied to the discharge port 22, so as to be discharged from the discharge port 22.

The accumulator 25 stores control oil under pressure. That is, a gas such as nitrogen is sealed in the accumulator 25, and the gas is separated by a diaphragm (bladder type accumulator) or a piston (piston type accumulator). Filling the control oil while compressing the gas with this configuration enables the accumulator 25 to store the pressurized control oil. The accumulator 25 and the first control oil supply path 28 are connected by an accumulator filling path 42. The accumulator filling path 42 is connected to the branch point P2 (halfway position) provided in the first control oil supply path 28 on the side closer to the servo valve 23 side rather than to the supply port-side check valve 32 described above. The control oil supplied to the supply port 21 is then supplied to the accumulator 25 via the first control oil supply path 28 and the accumulator filling path 42, and the accumulator 25 is filled with the control oil.

The blocking valve 26 is configured to be switchable between a state permitting the flow of control oil from the accumulator 25 to the closing direction piston chamber 13 and a state blocking the flow of the control oil (to permit or block the flow of the control oil).

More specifically, the blocking valve 26 has a configuration in which the P-port of the blocking valve 26 and the accumulator 25 are connected by an accumulator discharge path 43. The accumulator discharge path 43 is connected to the accumulator filling path 42 at a branch point P3. The A-port of the blocking valve 26 and the first closed-side channel 29 are connected by the second closed-side channel 44. The second closed-side channel 44 is connected to the branch point P4 (halfway position) provided in the first closed-side channel 29 on the side closer to the closing direction piston chamber 13 rather than to the closed-side pilot check valve 35. The X-port (pilot port) of the blocking valve 26 is connected to the B-port of the trip solenoid valve 27.

The blocking valve 26 is controlled by the trip solenoid valve 27. That is, the blocking valve 26 is configured such that, in the state where emergency oil is supplied from the B-port of the trip solenoid valve 27 to the X-port, the X-port is pressurized by the emergency oil and closed, blocking the P-port and the A-port of the blocking valve 26. This blocks the flow of control oil from the accumulator 25 to the closing direction piston chamber 13. In contrast, in a state where the emergency oil is not supplied to the X-port, the blocking valve 26 is opened, allowing communication between the P-port and the A-port of the blocking valve 26. This permits the flow of control oil from the accumulator 25 to the closing direction piston chamber 13, and the control oil is supplied from the accumulator discharge path 43 to the second closed-side channel 44 via the P-port and A-port of the blocking valve 26. The control oil supplied to the second closed-side channel 44 is then supplied to the closing direction piston chamber 13 via the first closed-side channel 29.

The trip solenoid valve 27 controls the dump valve 24 and the blocking valve 26 as described above. The trip solenoid valve 27 is configured to be switchable between a state permitting the flow of the emergency oil from the supply port 21 to the X-port of the dump valve 24 and the X-port of the blocking valve 26, and a state permitting the flow of the emergency oil from the X-port of the dump valve 24 and the X-port of the blocking valve 26 to the discharge port 22. The trip solenoid valve 27 controls the first open-side pilot check valve 33, the second open-side pilot check valve 34, and the closed-side pilot check valve 35. That is, in a case where the trip solenoid valve 27 permits the flow of the emergency oil to the X-port of the dump valve 24 and the X-port of the blocking valve 26, the trip solenoid valve 27 permits the flow of the emergency oil to each of the X-port of the first open-side pilot check valve 33, the X-port of the second open-side pilot check valve 34, and the X-port of the closed-side pilot check valve 35. Here, emergency oil means the control oil (hydraulic oil) supplied from the trip solenoid valve 27 to the X-port of each of the valves.

More specifically, the trip solenoid valve 27 has a configuration in which the P-port of the trip solenoid valve 27 and the first control oil supply path 28 are connected by a second control oil supply path 45. The second control oil supply path 45 is connected to the branch point P2 (halfway position) provided in the first control oil supply path 28 on the side closer to the servo valve 23 rather than to the supply port-side check valve 32. In the configuration illustrated in FIG. 1, there is a match in the branch point at which the accumulator filling path 42 is connected to the first control oil supply path 28, and the branch point at which the second control oil supply path 45 is connected to the first control oil supply path 28. However, the present embodiment is not limited to this. The B-port of the trip solenoid valve 27 is connected to the X-port of the dump valve 24 and the X-port of the blocking valve 26 via an emergency oil channel 46. The B-port of the trip solenoid valve 27 is also connected to the X-port of the first open-side pilot check valve 33, the X-port of the second open-side pilot check valve 34, and the X-port of the closed-side pilot check valve 35 via the emergency oil channel 46. The emergency oil channel 46 has a branch structure so as to connect the B-port of the trip solenoid valve 27 to the X-ports of the valves 24, 26, 33 to 35. The T-port of the trip solenoid valve 27 is connected to a trip discharge path 47. The trip discharge path 47 merges with the dump discharge path 41 described above, and is connected to the discharge port 22 via the trip discharge path 47.

The trip solenoid valve 27 includes a coil that is energized when it receives an electrical signal transmitted from a control device (not illustrated). Energization of the coil allows communication between the P-port and B-port of the trip solenoid valve 27, and permits the flow of emergency oil from the second control oil supply path 45 to the emergency oil channel 46. With this configuration, the emergency oil is supplied from the second control oil supply path 45 to the emergency oil channel 46 via the P-port and B-port of the trip solenoid valve 27. In contrast, in the absence of the electrical signal, the coil is de-energized and the P-port and B-port of the trip solenoid valve 27 are blocked, so as to block the flow of the emergency oil from the second control oil supply path 45 to the emergency oil channel 46. Instead, the T-port and the B-port come in communication with each other, permitting the flow of the emergency oil from the emergency oil channel 46 to the trip discharge path 47. With this configuration, the emergency oil is supplied from the emergency oil channel 46 to the trip discharge path 47 via the B-port and T-port of the trip solenoid valve 27. The emergency oil supplied to the trip discharge path 47 is supplied to the discharge port 22 via the dump discharge path 41, and then discharged from the discharge port 22.

The trip discharge path 47 is provided with a check valve 48. The check valve 48 is configured to permit the flow of the emergency oil to the discharge port 22 and block the flow of the control oil to the trip solenoid valve 27. That is, the check valve 48 prevents the control oil discharged from the T-port of the servo valve 23, discharged from the A-port of the dump valve 24, or discharged from the cylinder 10, from being supplied to the T-port of the trip solenoid valve 27.

Next, actions in the present embodiment having such a configuration will be described.

In the case of opening (resetting) the steam valve SV, the trip solenoid valve 27 is energized as illustrated in FIG. 1. This allows communication between the P-port and B-port of the trip solenoid valve 27, so as to supply the emergency oil from the supply port 21 to the X-port of the dump valve 24 and the X-port of the blocking valve 26 via the trip solenoid valve 27 and the emergency oil channel 46. With this configuration, the X-port of the dump valve 24 is pressurized to close the dump valve 24. This will block the flow of control oil from the opening direction piston chamber 12 to the discharge port 22. The X-port of the blocking valve 26 is also pressurized, closing the blocking valve 26 as well. This blocks the flow of control oil from the accumulator 25 to the closing direction piston chamber 13.

Energization of the trip solenoid valve 27 allows the emergency oil to be also supplied to the X-port of the first open-side pilot check valve 33, the X-port of the second open-side pilot check valve 34, and the X-port of the closed-side pilot check valve 35, so as to pressurize the X-port of each of the valves 33 to 35. With this pressurization, the check valve function of each of the valves 33 to 35 is lost, permitting the flow of the control oil in both directions in each of the valves 33 to 35.

Furthermore, in the case of opening the steam valve SV, a first electrical signal being an electrical command in the opening direction is input to the servo valve 23. This allows communication between the P-port and B-port of the servo valve 23, and then the control oil is supplied from the supply port 21 to the open-side channel 30 via the servo valve 23. As described above, the check valve function is lost in the first open-side pilot check valve 33 and the second open-side pilot check valve 34 provided in the open-side channel 30. With this configuration, the control oil supplied to the open-side channel 30 will be supplied to the opening direction piston chamber 12.

Furthermore, the input of the first electrical signal to the servo valve 23 allows the A-port and the T-port of the servo valve 23 to communicate with each other. The closed-side pilot check valve 35 provided in the first closed-side channel 29 has lost the check valve function as described above. With this configuration, the control oil in the closing direction piston chamber 13 is discharged to the discharge port 22 via the servo valve 23 and the servo discharge path 31.

When the control oil is supplied to the opening direction piston chamber 12, the pressure of the control oil in the opening direction piston chamber 12 increases. When the control oil in the closing direction piston chamber 13 is discharged, the piston 11 is pressed by the control oil in the opening direction piston chamber 12, moving the valve body VB in the opening direction. In this manner, the steam valve SV is opened.

In contrast, in a case where the steam valve SV is rapidly closed (tripped), the trip solenoid valve 27 is de-energized as illustrated in FIG. 2, and the trip solenoid valve 27 trips due to the action of the spring. This allows communication between the B-port and T-port of the trip solenoid valve 27 as illustrated by the broken line in FIG. 2. This causes the emergency oil in the X-port of the dump valve 24 and the emergency oil in the X-port of the blocking valve 26 to be discharged to the discharge port 22 via the emergency oil channel 46, the trip solenoid valve 27, and the trip discharge path 47. This causes the emergency oil to be discharged from the X-port of the dump valve 24 to open the dump valve 24, and causes the emergency oil to be discharged from the X-port of the blocking valve 26 to open the blocking valve 26 by the action of the spring.

In addition, de-energized of the trip solenoid valve 27 allows the emergency oil in the X-port of the first open-side pilot check valve 33, emergency oil in the X-port of the second open-side pilot check valve 34, and the emergency oil in the X-port of the closed-side pilot check valve 35 to be discharged to the discharge port 22 in a similar manner. This causes the emergency oil to be discharged from the X-port of each of the valves 33 to 35, allowing each of the valves 33 to 35 to exert a backflow prevention function.

Opening the dump valve 24 as described above would allow the B-port and the A-port of the dump valve 24 to communicate with each other. The second open-side pilot check valve 34 permits the flow of control oil to the branch point P1 while the first open-side pilot check valve 33 blocks the flow of control oil to the servo valve 23. Accordingly, the control oil in the opening direction piston chamber 12 is discharged to the discharge port 22 via the dump channel 40, the dump valve 24, and the dump discharge path 41.

Moreover, opening the blocking valve 26 as described above allows the P-port and A-port of the blocking valve 26 to communicate with each other, so as to supply the control oil in the accumulator 25 from the accumulator discharge path 43 to the second closed-side channel 44 via the blocking valve 26. Since the closed-side pilot check valve 35 blocks the flow of control oil to the servo valve 23, the control oil supplied to the second closed-side channel 44 is then supplied to the closing direction piston chamber 13 via the first closed-side channel 29.

When the control oil is supplied to the closing direction piston chamber 13, the pressure of the control oil in the closing direction piston chamber 13 increases. When the control oil in the opening direction piston chamber 12 is discharged, the piston 11 is pressed by the control oil in the closing direction piston chamber 13, moving the valve body VB in the closing direction. In this manner, the steam valve SV is rapidly closed.

When the steam valve SV is rapidly closed, the control oil in the opening direction piston chamber 12 is discharged from the dump valve 24 having a large discharge capacity, making it possible to rapidly discharge the control oil in the opening direction piston chamber 12. Furthermore, the control oil is supplied to the closing direction piston chamber 13 from the accumulator 25 that stores the control oil under pressure. Therefore, the closing direction piston chamber 13 can be rapidly supplied with the control oil. This makes it possible to rapidly increase the pressure of the control oil in the closing direction piston chamber 13 for exerting the fail-safe function. This enables the valve body VB to rapidly move in the closing direction, making it possible to rapidly close the steam valve SV. That is, the fail-safe function can be enhanced.

Meanwhile, the steam valve driving apparatus 1 according to the present embodiment is provided with the supply port-side check valve 32 provided in the first control oil supply path 28. The cracking pressure in the supply port-side check valve 32 is set so as to correspond to the minimum operating pressure of the steam valve driving apparatus 1. With this configuration, even when the supply of control oil from the control oil supply system is interrupted or the supply pressure of the control oil is gradually reduced, the supply port-side check valve 32 can prevent the pressure of the control oil and the pressure of the emergency oil in the steam valve driving apparatus 1 from dropping below the minimum operating pressure. Furthermore, since the steam valve driving apparatus 1 according to the present embodiment includes the accumulator 25, the control oil can be supplied from the accumulator 25 to the servo valve 23, the trip solenoid valve 27, or the like. This also makes it possible to prevent the reduction of the pressure of the control oil and the pressure of the emergency oil in the steam valve driving apparatus 1. This leads to improvement of the fail-safe function.

Furthermore, in a case where the power supply of the steam valve driving apparatus 1 is blocked, the trip solenoid valve 27 is de-energized in a similar manner as the case where the steam valve SV is rapidly closed. Subsequently, action of the spring allows communication between the B-port and the T-port, causing the emergency oil in the X-port of the dump valve 24 and the emergency oil in the X-port of the blocking valve 26 to be discharged to the discharge port 22. This opens the dump valve 24, causing the control oil in the opening direction piston chamber 12 to be discharged to the discharge port 22. Moreover, the action of the spring also opens the blocking valve 26, allowing communication between the P-port and the A-port of the blocking valve 26, so as to supply the control oil in the accumulator 25 to the closing direction piston chamber 13. Furthermore, the servo valve 23 is de-energized by the block of the power supply, and the action of the spring will block the P-port and the B-port in the servo valve 23, and allows communication between the P-port and the A-port. This blocks the flow of control oil toward the opening direction piston chamber 12. This enables the steam valve SV to be rapidly closed, leading to improvement of the fail-safe function.

According to the present embodiment in this manner, in the case of rapidly closing the steam valve SV, the dump valve 24 is controlled, by the trip solenoid valve 27, so as to permit the flow of the control oil from the opening direction piston chamber 12 of the cylinder 10 to the discharge port 22. This makes it possible to rapidly discharge the control oil in the opening direction piston chamber 12 to the discharge port 22 via the dump valve 24. Furthermore, the blocking valve 26 permits the flow of control oil from the accumulator 25 to the closing direction piston chamber 13. With this configuration, it is possible to rapidly supply the control oil stored in the accumulator 25 to the closing direction piston chamber 13, leading to a rapid increase of the pressure of the control oil in the closing direction piston chamber 13. With this configuration, the control oil in the closing direction piston chamber 13 can press the piston 11 so as to exert the fail-safe function, enabling the valve body VB to rapidly move in the closing direction to rapidly close the steam valve SV.

Furthermore, according to the present embodiment, in the case of opening the steam valve SV, the blocking valve 26 blocks the flow of control oil from the accumulator 25 to the closing direction piston chamber 13, and the servo valve 23 permits the flow of control oil from the chamber 13 to the discharge port 22. This makes it possible to discharge the control oil in the closing direction piston chamber 13 to the discharge port 22 via the servo valve 23. This makes it possible to prevent the piston 11 from receiving pressure in the closing direction from the control oil supplied to the closing direction piston chamber 13. As a result, in a case where the steam valve SV is open, it is possible to prevent the force for exerting the fail-safe function from being applied as a load to the piston 11 of the cylinder 10. In this case, it is possible to suppress an increase in the volume of the cylinder 10, leading to miniaturization of the cylinder 10.

Furthermore, according to the present embodiment, in a case of rapidly closing the steam valve SV, the trip solenoid valve 27 can discharge the emergency oil in the X-port of the dump valve 24 and the emergency oil in the X-port of the blocking valve 26 to the discharge port 22. This makes it possible to rapidly discharge the emergency oil in the opening direction piston chamber 12 to the discharge port 22 via the dump valve 24, and at the same time, makes it possible to rapidly supply the emergency oil stored in the accumulator 25 to the closing direction piston chamber 13. This enables rapid movement of the piston 11 in the closing direction of the steam valve SV, and enables rapid closing of the steam valve SV.

Furthermore, according to the present embodiment, the first open-side pilot check valve 33 that blocks the flow of the control oil to the servo valve 23 is provided in the open-side channel 30 connecting the servo valve 23 and the opening direction piston chamber 12, on the side closer to the servo valve 23 rather than to the branch point P1 to which the dump channel 40 is connected. This prevents the control oil from being supplied to the servo valve 23 when the control oil in the opening direction piston chamber 12 is discharged to the discharge port 22.

Furthermore, according to the present embodiment, the closed-side pilot check valve 35 that blocks the flow of the control oil to the servo valve 23 is provided in the first closed-side channel 29 connecting the servo valve 23 and the closing direction piston chamber 13, on the side closer to the servo valve 23 rather than to the branch point P4 to which the second closed-side channel 44 is connected. This makes it possible to prevent the control oil from being supplied to the servo valve 23 in a case where the control oil is supplied from the accumulator 25 to the closing direction piston chamber 13.

Furthermore, according to the present embodiment, the closed-side pilot check valve 35 loses its backflow prevention function by supply of the emergency oil to its X-port. This makes it possible to discharge the control oil in the closing direction piston chamber 13 to the discharge port 22 via the servo valve 23 in a case where the steam valve SV is opened.

Furthermore, according to the present embodiment, the supply port-side check valve 32 is provided in the first control oil supply path 28 on the side closer to the supply port 21 rather than to the branch point P2 to which the accumulator filling path 42 is connected. With this configuration, the flow of control oil to the supply port 21 is blocked, making it possible to prevent the control oil and emergency oil in the steam valve driving apparatus 1 from being supplied to the supply port 21. This also makes it possible to prevent the reduction of the pressure of the control oil and the pressure of the emergency oil in the steam valve driving apparatus 1.

The above-described embodiment has described an example in which the piston 11 of the cylinder 10 is joined to the valve body VB of the steam valve SV that linearly moves in the opening/closing direction. However, the present embodiment is not limited to this, and the piston 11 may be joined to a valve body of a steam valve such as a butterfly valve that pivots in an opening/closing direction. In this case, it is preferable that a mechanism for converting a linear motion of the piston 11 into a pivotal motion be interposed between the piston 11 and the valve body.

Moreover, the above-described embodiment is an example in which the control valve indicated by reference numeral 23 is the servo valve 23. However, the present embodiment is not limited to this, and the control valve indicated by reference numeral 23 can also be implemented as a solenoid valve. For example, it is allowable to have a configuration in which energization of the coil of the solenoid valve would permit the flow of control oil from the first control oil supply path 28 to the open-side channel 30, and de-energization of coil would block the flow of the control oil from the first control oil supply path 28 to the open-side channel 30.

Second Embodiment

Next, a steam valve driving apparatus according to a second embodiment of the present invention will be described with reference to FIGS. 3 and 4.

Figure 3:
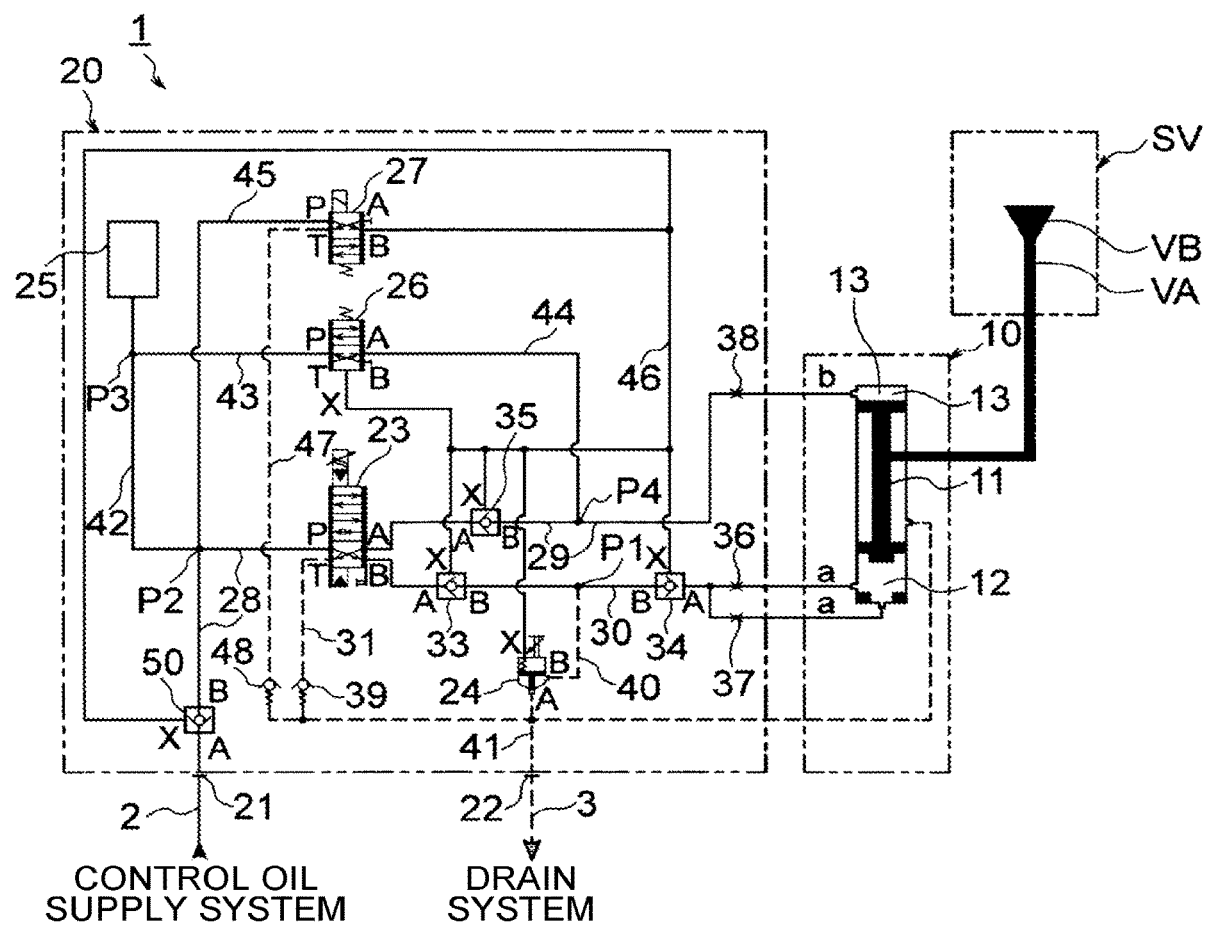
FIG. 3 is a system diagram illustrating a steam valve driving apparatus at the time of resetting the steam valve in a second embodiment.
Figure 4:
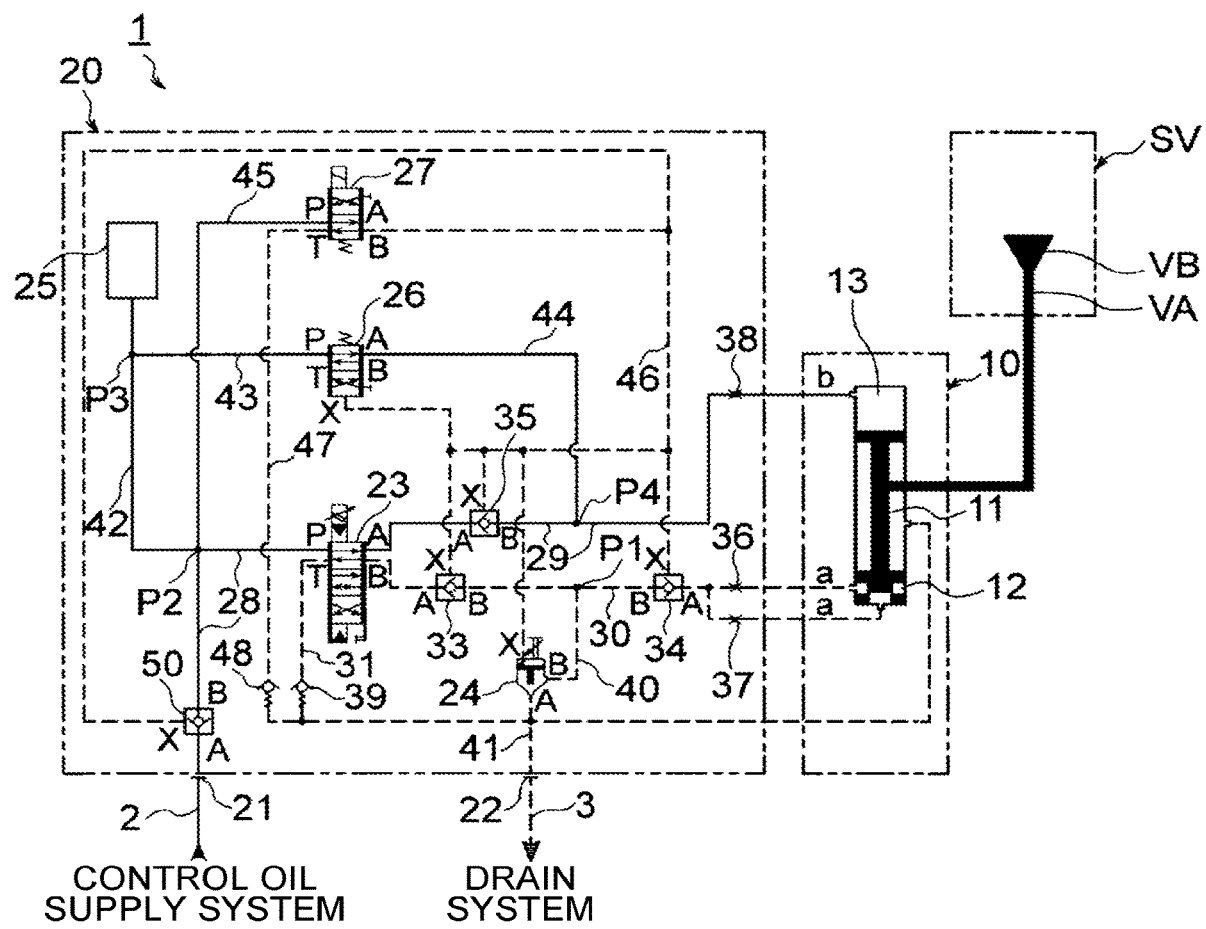
FIG. 4 is a system diagram at the time of trip of the steam valve in the steam valve driving apparatus of FIG. 3.

A main difference of the second embodiment illustrated in FIGS. 3 and 4 is that the supply port-side check valve is a pilot check valve controlled by a trip solenoid valve. Other configuration is substantially the same as of the first embodiment illustrated in FIGS. 1 and 2. In FIGS. 3 and 4, the same portions as those of the first embodiment illustrated in FIGS. 1 and 2 will be denoted by the same reference numerals, and a detailed description thereof will be omitted.

In the present embodiment, as illustrated in FIG. 3, the supply port-side check valve 32 illustrated in FIGS. 1 and 2 is implemented as a pilot check valve. That is, the first control oil supply path 28 is provided with a supply port-side pilot check valve 50 (supply port-side backflow prevention function valve). The supply port-side pilot check valve 50 is controlled by the trip solenoid valve 27.

More specifically, the A-port and the B-port of the supply port-side pilot check valve 50 form a part of the first control oil supply path 28, while the X-port of the supply port-side pilot check valve 50 is connected to the B-port of the trip solenoid valve 27 via the emergency oil channel 46. The supply port-side pilot check valve 50 is configured such that in the state where emergency oil from the trip solenoid valve 27 is supplied to the X-port, the X-port would be pressurized by the emergency oil to cause the supply port-side pilot check valve 50 to lose the backflow prevention function so as to permit the flow of control oil in both directions. In contrast, the supply port-side pilot check valve 50 has a backflow prevention function in a state where emergency oil is not supplied to the X-port. This would permit the flow of control oil to the branch point P2, while blocking the flow of the control oil to the supply port 21.

In the case of opening the steam valve SV, as illustrated in FIG. 3, emergency oil is supplied from the B-port of the trip solenoid valve 27 to the X-port of the supply port-side pilot check valve 50, pressurizing the X-port. Therefore, the check valve function of the supply port-side pilot check valve 50 would be lost, permitting the flow of control oil in both directions in the supply port-side pilot check valve 50. This allows the control oil to be supplied from the supply port 21 to the servo valve 23, the trip solenoid valve 27, and the accumulator 25.

In the case of rapidly closing the steam valve SV, the emergency oil in the X-port of the supply port-side pilot check valve 50 passes through the emergency oil channel 46, the trip solenoid valve 27, and the trip discharge path 47 and then is discharged to the discharge port 22, as illustrated in FIG. 4. With this configuration, the emergency oil is discharged from the X-port of the supply port-side pilot check valve 50. Therefore, the supply port-side pilot check valve 50 exerts a backflow prevention function, and this will block the flow of control oil to the supply port 21.

Note that the accumulator 25 according to the present embodiment preferably stores an oil amount that can pressurize the X-port so that the supply port-side pilot check valve 50 can lose its check valve function when the steam valve SV is opened after being rapidly closed.

In this manner, according to the present embodiment, the supply port-side backflow prevention function valve is implemented as the supply port-side pilot check valve 50. With this configuration, it is possible to detect a decrease in the pressure of the control oil in the control oil supply system, detect blocking of power supply and trip operation of the trip solenoid valve 27, leading to prevention of reduction in the pressure of the control oil in the steam valve driving apparatus 1.

That is, a decrease in the pressure of the control oil in the control oil supply system leads to a decrease in the pressure of the emergency oil in the X-port of the supply port-side pilot check valve 50. With this configuration, the supply port-side pilot check valve 50 can exert a backflow prevention function, making it possible to block the flow of control oil to the supply port 21. This makes it possible to prevent the control oil in the steam valve driving apparatus 1 from being supplied to the supply port 21, and prevent the reduction of the pressure of the control oil in the steam valve driving apparatus 1.

Furthermore, in a case where the power supply of the steam valve driving apparatus 1 is blocked, the trip solenoid valve 27 is de-energized. This makes it possible to discharge the emergency oil in the X-port of the supply port-side pilot check valve 50. This enables the supply port-side pilot check valve 50 to exert a backflow prevention function, and it is possible, in a similar manner, to prevent the reduction of the pressure of the control oil in the steam valve driving apparatus 1.

Furthermore, in a case where the trip solenoid valve 27 makes trip operation, the emergency oil in the X-port of the supply port-side pilot check valve 50 can be discharged. This enables the supply port-side pilot check valve 50 to exert a backflow prevention function, and it is possible, in a similar manner, to prevent the reduction of the pressure of the control oil in the steam valve driving apparatus 1.

Third Embodiment

Next, a steam valve driving apparatus according to a third embodiment of the present invention will be described with reference to FIGS. 5 and 6.

Figure 5:
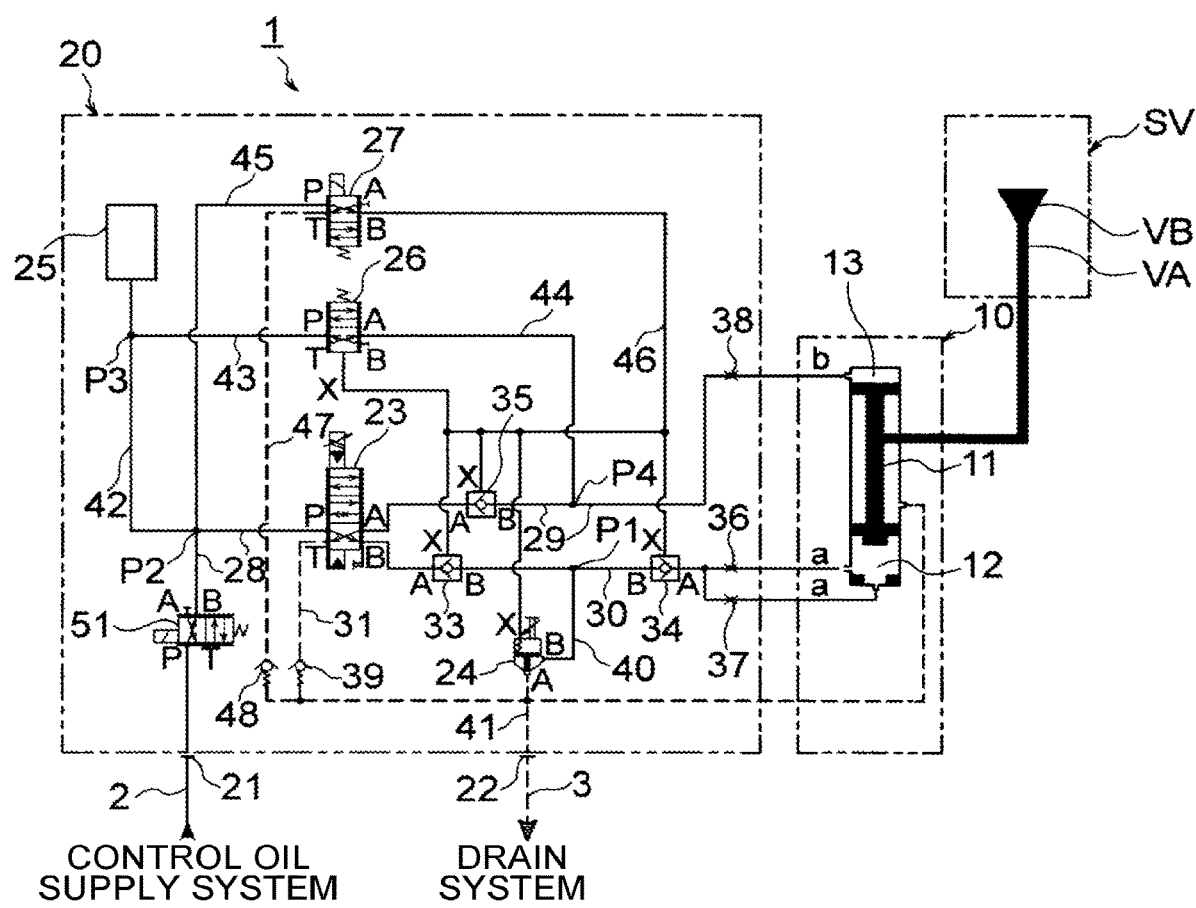
FIG. 5 is a system diagram illustrating a steam valve driving apparatus at the time of resetting the steam valve in a third embodiment.
Figure 6:
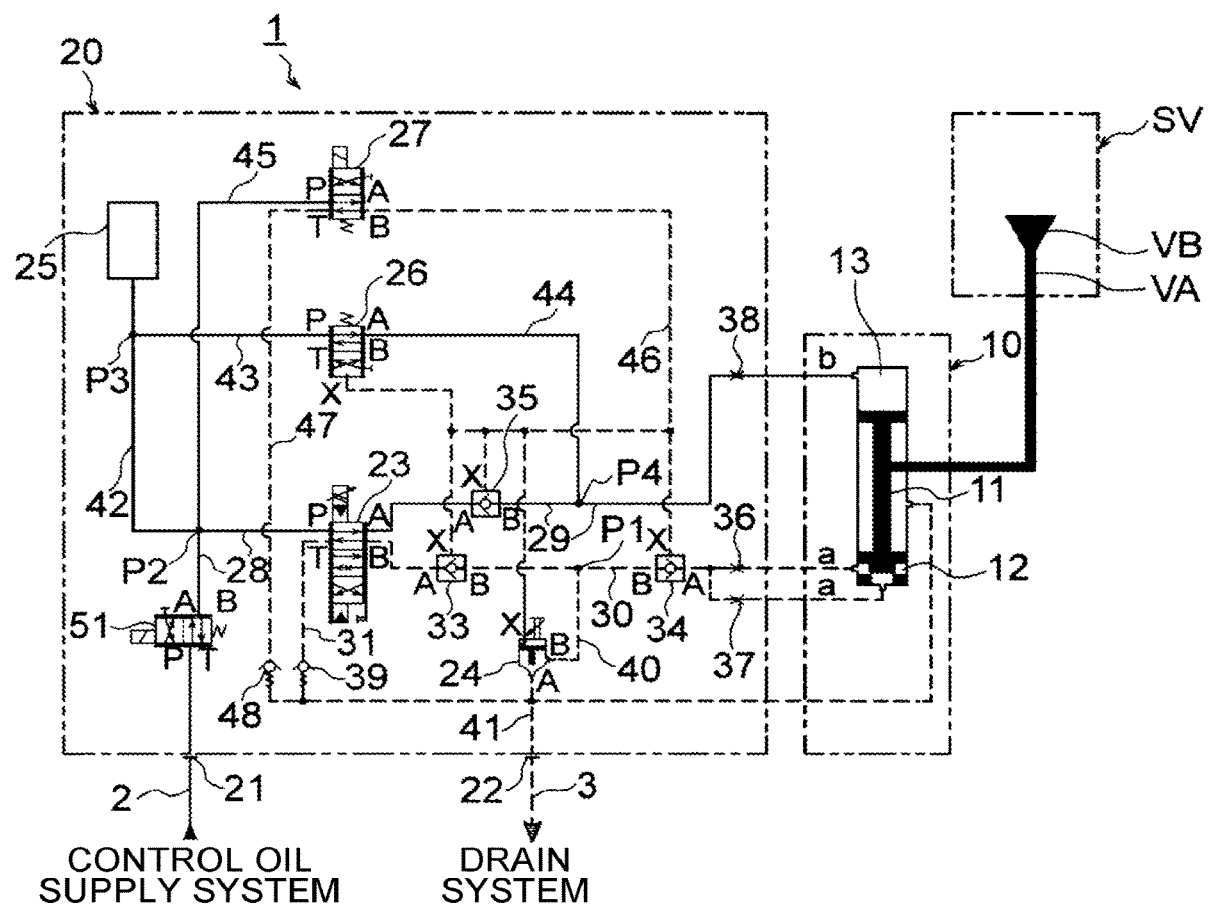
FIG. 6 is a system diagram at the time of trip of the steam valve in the steam valve driving apparatus of FIG. 5.

A main difference of the third embodiment illustrated in FIGS. 5 and 6 is that the supply port-side check valve is a solenoid valve. Other configuration is substantially the same as of the first embodiment illustrated in FIGS. 1 and 2. In FIGS. 5 and 6, the same portions as those of the first embodiment illustrated in FIGS. 1 and 2 will be denoted by the same reference numerals, and a detailed description thereof will be omitted.

In the present embodiment, as illustrated in FIG. 5, the supply port-side check valve 32 illustrated in FIGS. 1 and 2 is implemented as a solenoid valve. That is, the first control oil supply path 28 is provided with a supply port-side solenoid valve 51 (supply port-side backflow prevention function valve).

Similarly to the servo valve 23 and the trip solenoid valve 27, the supply port-side solenoid valve 51 includes a coil that is energized when it receives an electrical signal transmitted from a control device (not illustrated). The supply port-side solenoid valve 51 has a configuration in which, in a state where the coil is energized, the P-port and B-port of the supply port-side solenoid valve 51 communicates with each other, losing the backflow prevention function so as to permit the flow of control oil in both directions. In contrast, the supply port-side solenoid valve 51 has a backflow prevention function obtained by the action of a spring, and blocks the flow of control oil to the supply port 21 in a state where the coil is de-energized. In the present embodiment, the flow of control oil to the branch point P2 is also blocked in a de-energized state.

In the case of opening the steam valve SV, the supply port-side solenoid valve 51 is energized as illustrated in FIG. 5. Therefore, the backflow prevention function of the supply port-side solenoid valve 51 would be lost, permitting the flow of control oil in both directions in the supply port-side solenoid valve 51. This allows the control oil to be supplied from the supply port 21 to the servo valve 23, the trip solenoid valve 27, and the accumulator 25.

In the case of rapidly closing the steam valve SV, the supply port-side solenoid valve 51 will be de-energized as illustrated in FIG. 6. Therefore, the supply port-side solenoid valve 51 exerts a backflow prevention function, and this blocks the flow of control oil to the supply port 21.

In this manner, according to the present embodiment, the supply port-side backflow prevention function valve is implemented as the supply port-side solenoid valve 51. With this configuration, it is possible to detect a decrease in the pressure of the control oil in the control oil supply system, detect blocking of power supply, leading to prevention of reduction in the pressure of the control oil and pressure of the emergency oil in the steam valve driving apparatus 1.

That is, in a case where the pressure of the control oil in the control oil supply system decreases, the supply port-side solenoid valve 51 can be controlled to perform de-energization. This enables the supply port-side solenoid valve 51 to exert a backflow prevention function, making it possible to block the flow of control oil to the supply port 21. This makes it possible to prevent the control oil and the emergency oil in the steam valve driving apparatus 1 from being supplied to the supply port 21, and prevent the reduction of the pressure of the control oil and the pressure of the emergency oil in the steam valve driving apparatus 1.

Furthermore, in a case where the power supply of the steam valve driving apparatus 1 is blocked, the supply port-side solenoid valve 51 is de-energized. This enables the supply port-side solenoid valve 51 to exert a backflow prevention function, and it is possible, in a similar manner, to prevent the reduction of the pressure of the control oil and the pressure of the emergency oil in the steam valve driving apparatus 1.

The above-described embodiment has described an example in which the supply port-side solenoid valve 51 is implemented as a spool valve. However, the present embodiment is not limited to this, and the supply port-side solenoid valve 51 may be implemented as a poppet valve. For example, the supply port-side solenoid valve 51 may be configured to be energized and opened in the case of opening the steam valve SV (FIG. 5), and be de-energized and closed in the case of rapidly closing the steam valve SV (FIG. 6).

In this case, it is possible to further prevent the reduction of the pressure of the control oil and the pressure of the emergency oil in the steam valve driving apparatus 1.

Fourth Embodiment

Next, a steam valve driving apparatus according to a fourth embodiment of the present invention will be described with reference to FIGS. 7 and 8.

Figure 7:
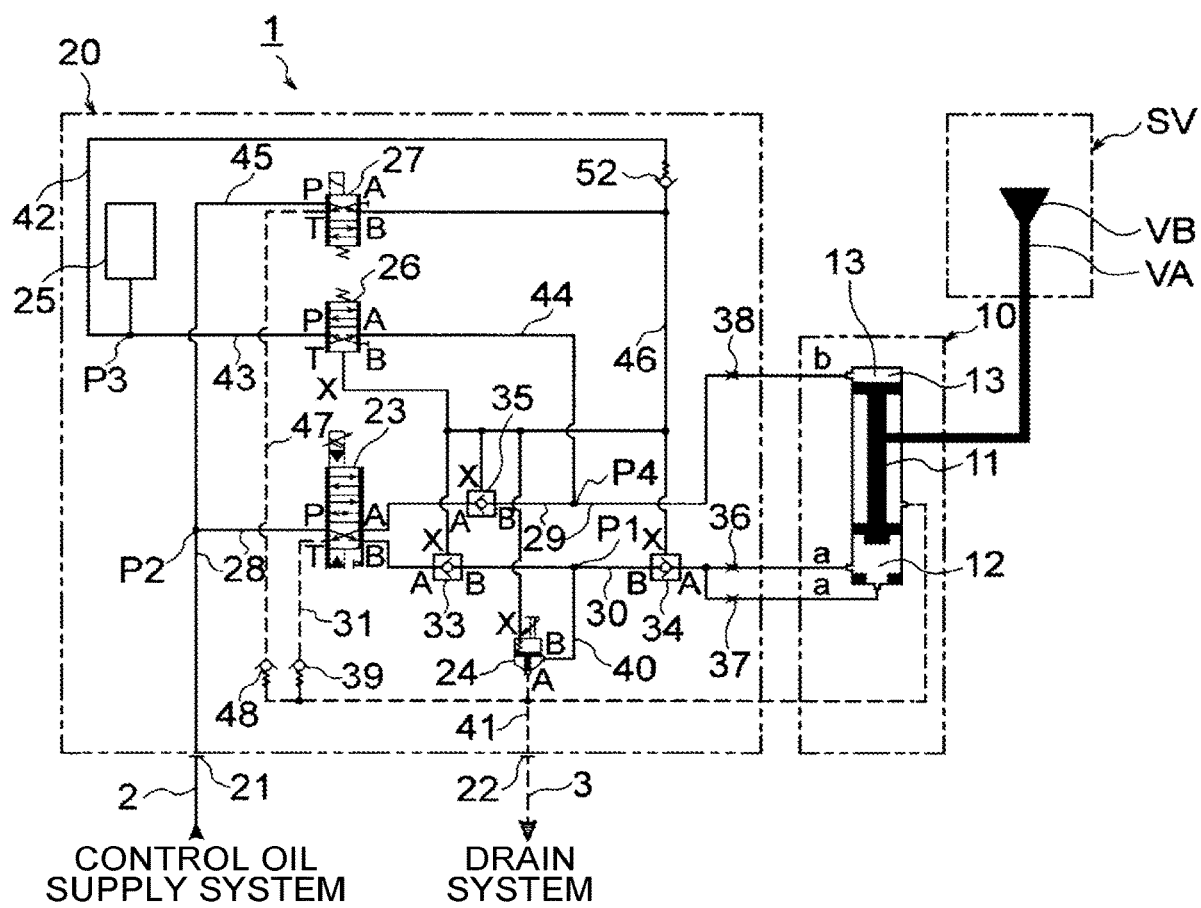
FIG. 7 is a system diagram illustrating a steam valve driving apparatus at the time of resetting the steam valve in a fourth embodiment.
Figure 8:
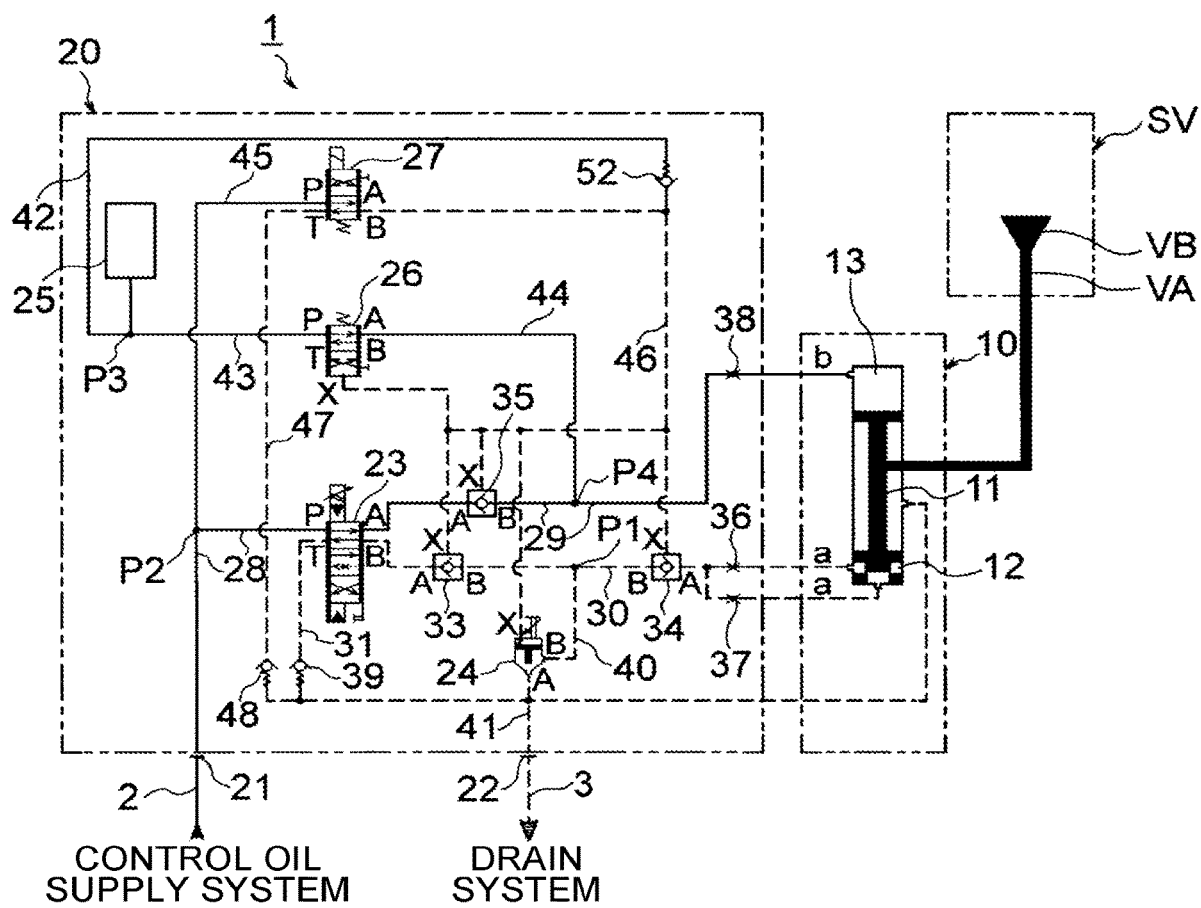
FIG. 8 is a system diagram at the time of trip of the steam valve in the steam valve driving apparatus of FIG. 7.

A main difference of the fourth embodiment illustrated in FIGS. 7 and 8 is that hydraulic oil is supplied to the accumulator via the trip solenoid valve. Other configuration is substantially the same as of the first embodiment illustrated in FIGS. 1 and 2. In FIGS. 7 and 8, the same portions as those of the first embodiment illustrated in FIGS. 1 and 2 will be denoted by the same reference numerals, and a detailed description thereof will be omitted.

In the present embodiment, as illustrated in FIG. 7, the B-port of trip solenoid valve 27 and accumulator 25 are connected by the accumulator filling path 42. That is, the accumulator filling path 42 according to the present embodiment is connected to the emergency oil channel 46 as illustrated in FIG. 7, rather than connected to the first control oil supply path 28 as illustrated in FIG. 1. The control oil supplied to the trip solenoid valve 27 is supplied to the accumulator 25 via the emergency oil channel 46 and the accumulator filling path 42, and the accumulator 25 is filled with the control oil.

The accumulator filling path 42 is provided with an accumulator-side check valve 52 (accumulator-side backflow prevention valve). This accumulator-side check valve 52 is configured to permit the flow to the accumulator 25 and block the flow to the trip solenoid valve 27 (more specifically, the emergency oil channel 46). In addition, the cracking pressure of the accumulator-side check valve 52 is set to a minimum operating pressure of the steam valve driving apparatus 1.

In a case where the steam valve SV is opened, the control oil is supplied from the B-port of the trip solenoid valve 27 to the accumulator 25 via the accumulator filling path 42, as illustrated in FIG. 7.

In the case of rapidly closing the steam valve SV, as illustrated in FIG. 8, the blocking valve 26 is opened. Subsequently, the control oil in the accumulator 25 is supplied from the accumulator discharge path 43 to the closing direction piston chamber 13 via the blocking valve 26, the second closed-side channel 44, and the first closed-side channel 29. At this time, the emergency oil is discharged from the emergency oil channel 46. Since the accumulator-side check valve 52 is provided in the accumulator filling path 42, it is possible to prevent the control oil in the accumulator 25 from flowing from the accumulator filling path 42 to the emergency oil channel 46.

In this manner, according to the present embodiment, the accumulator-side check valve 52 is provided in the accumulator filling path 42 that connects the accumulator 25 to the trip solenoid valve 27. With this configuration, the control oil stored in the accumulator 25 can be supplied to the blocking valve 26. This makes it possible to prevent the control oil stored in the accumulator 25 from being supplied to the servo valve 23 and the trip solenoid valve 27. Accordingly, the control oil in the accumulator 25 can be used for operation for rapidly closing the steam valve SV, leading to improvement of the reliability of the steam valve driving apparatus 1.

Fifth Embodiment

Next, a steam valve driving apparatus according to a fifth embodiment of the present invention will be described with reference to FIGS. 9 and 10.

Figure 9:
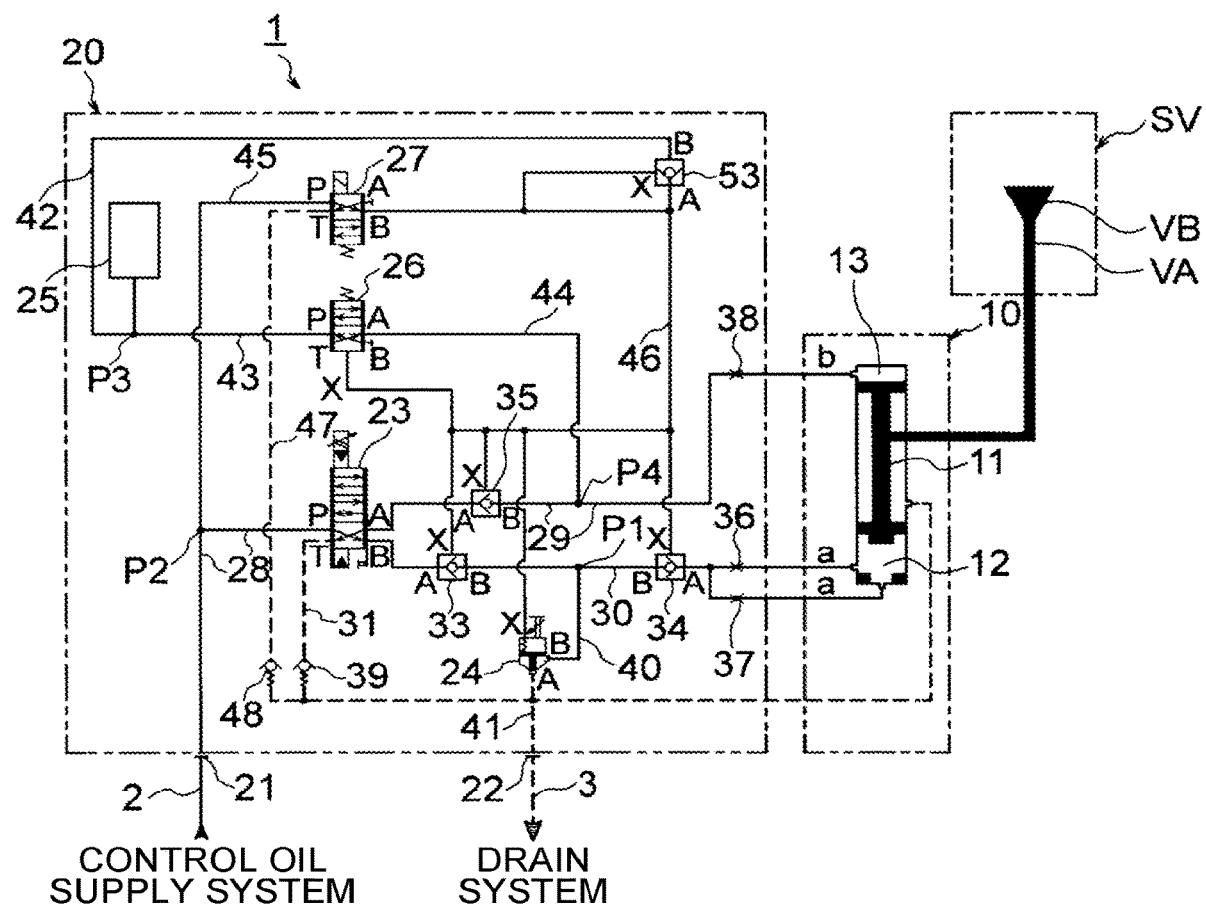
FIG. 9 is a system diagram illustrating a steam valve driving apparatus at the time of resetting the steam valve in a fifth embodiment.
Figure 10:
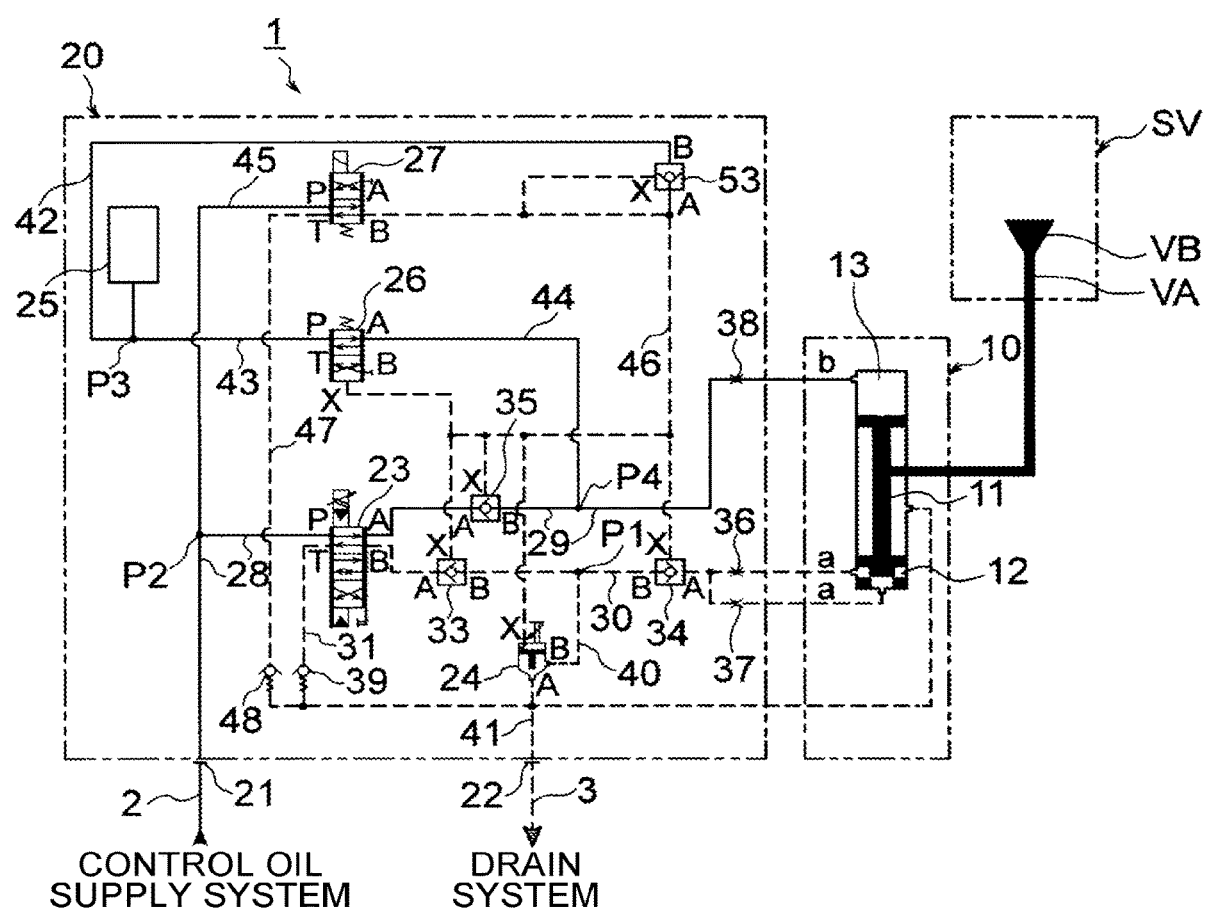
FIG. 10 is a system diagram at the time of trip of the steam valve in the steam valve driving apparatus of FIG. 9.

A main difference of the fifth embodiment illustrated in FIGS. 9 and 10 is that the accumulator-side check valve is a pilot check valve controlled by a trip solenoid valve. Other configuration is substantially the same as of the fourth embodiment illustrated in FIGS. 7 and 8. In FIGS. 9 and 10, the same portions as those of the fourth embodiment illustrated in FIGS. 7 and 8 will be denoted by the same reference numerals, and a detailed description thereof will be omitted.

In the present embodiment, as illustrated in FIG. 9, the accumulator-side check valve illustrated in FIGS. 7 and 8 is implemented as a pilot check valve. That is, the accumulator filling path 42 is provided with an accumulator-side pilot check valve 53 (accumulator-side backflow prevention valve). This accumulator-side pilot check valve 53 is controlled by a trip solenoid valve 27.

More specifically, the A-port and the B-port of the accumulator-side pilot check valve 53 form a part of the accumulator filling path 42. The B-port of trip solenoid valve 27 is connected to the X-port of the accumulator-side pilot check valve 53 via the emergency oil channel 46. The accumulator-side pilot check valve 53 is configured such that in a state where emergency oil from the trip solenoid valve 27 is supplied to the X-port, the X-port would be pressurized by the emergency oil. This will cause the accumulator-side pilot check valve 53 to lose the backflow prevention function, and permit the flow of control oil in both directions. In contrast, the accumulator-side pilot check valve 53 has a backflow prevention function in a state where the emergency oil is not supplied to the X-port. This would permit the flow of control oil to the accumulator 25, while blocking the flow of the control oil to the trip solenoid valve 27 (more specifically, the emergency oil channel 46).

In the case of opening the steam valve SV, as illustrated in FIG. 9, emergency oil is supplied from the B-port of the trip solenoid valve 27 to the X-port of the accumulator-side pilot check valve 53, pressurizing the X-port. Therefore, the check valve function of the accumulator-side pilot check valve 53 would be lost, permitting the flow of control oil in both directions in the accumulator-side pilot check valve 53. This allows the control oil to be supplied from the trip solenoid valve 27 to the accumulator 25.

In the case of rapidly closing the steam valve SV, the emergency oil in the X-port of the accumulator-side pilot check valve 53 is discharged to the discharge port 22 via the emergency oil channel 46, the trip solenoid valve 27, and the trip discharge path 47, as illustrated in FIG. 10. With this configuration, the emergency oil is discharged from the X-port of the accumulator-side pilot check valve 53. Therefore, the accumulator-side pilot check valve 53 exerts a backflow prevention function, and this will block the flow of control oil to the emergency oil channel 46.

In this manner, according to the present embodiment, the accumulator-side pilot check valve 53 is provided in the accumulator filling path 42 that connects the accumulator 25 to the trip solenoid valve 27. With this configuration, the control oil stored in the accumulator 25 can be supplied to the blocking valve 26. This makes it possible to prevent the control oil stored in the accumulator 25 from being supplied to the servo valve 23 and the trip solenoid valve 27. Accordingly, the control oil in the accumulator 25 can be used for operation for rapidly closing the steam valve SV, leading to improvement of the reliability of the steam valve driving apparatus 1.

Sixth Embodiment

Next, a steam valve driving apparatus according to a sixth embodiment of the present invention will be described with reference to FIGS. 11 and 12.

Figure 11:
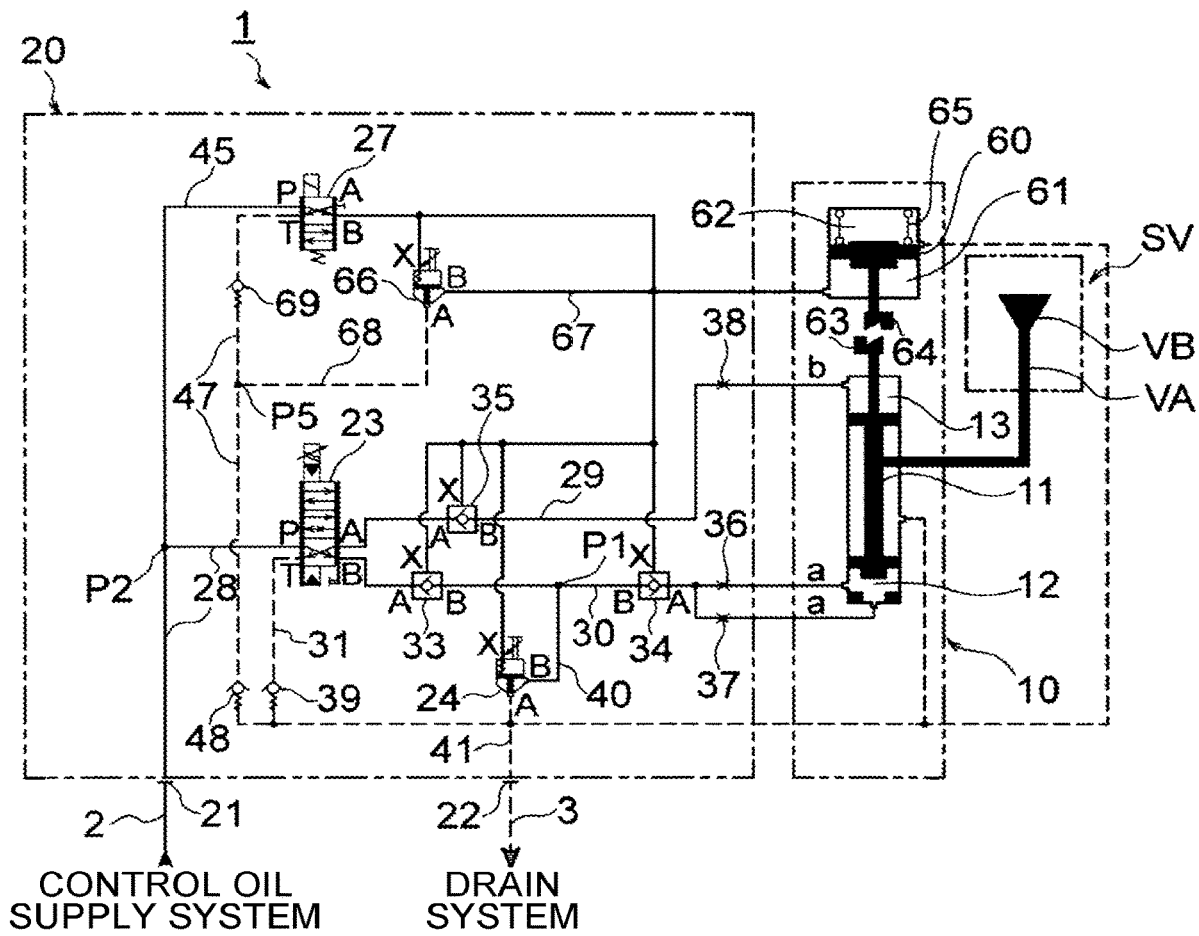
FIG. 11 is a system diagram illustrating a steam valve driving apparatus at the time of resetting the steam valve in a sixth embodiment.
Figure 12:
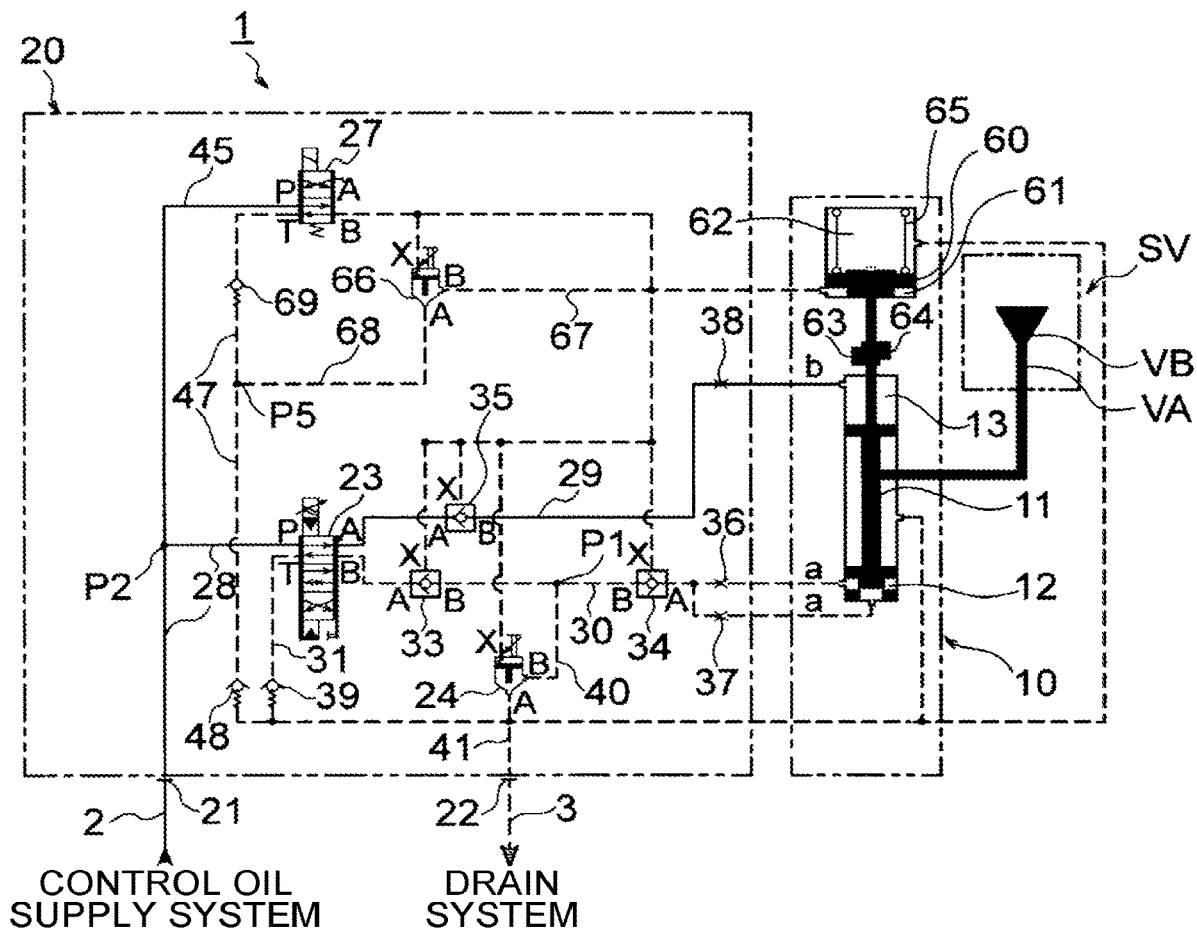
FIG. 12 is a system diagram at the time of trip of the steam valve in the steam valve driving apparatus of FIG. 11.

A main difference of the sixth embodiment illustrated in FIGS. 11 and 12 is in that a second piston releasably provided with respect to the first piston of the cylinder is pressed in the closing direction of the valve body by the closing spring. Other configurations are substantially the same as those of the first embodiment illustrated in FIGS. 1 and 2. In FIGS. 11 and 12, the same portions as those of the first embodiment illustrated in FIGS. 1 and 2 will be denoted by the same reference numerals, and a detailed description thereof will be omitted.

In the present embodiment, as illustrated in FIG. 11, the cylinder 10 includes a first piston 11 (corresponding to the piston 11 illustrated in FIG. 1) joined to the valve body VB, an opening direction first piston chamber (corresponding to the opening direction piston chamber 12 illustrated in FIG. 1) and a closing direction first piston chamber (corresponding to the closing direction piston chamber 13 illustrated in FIG. 1). The cylinder 10 further includes a second piston 60 releasably provided with respect to the valve body VB of the steam valve SV, an opening direction second piston chamber 61, and a closing direction second piston chamber 62.

In the present embodiment, the first piston 11 is joined to the valve body VB, and the second piston 60 is releasably provided with respect to the first piston 11. More specifically, a first coupling member 63 is provided at the second piston 60-side end of the first piston 11, and a second coupling member 64 is provided at the first piston 11-side end of the second piston 60. In a case where the steam valve SV is closed, the second coupling member 64 comes in contact with the first coupling member 63, causing the second piston 60 to be joined to the valve body VB via the first piston 11. The second piston 60 is configured to press the first piston 11 to a fully closed position of the steam valve SV. In contrast, in a case where the steam valve SV is opened, the second coupling member 64 is separated from the first coupling member 63, causing the second piston 60 to be separated from the first piston 11 (that is, the valve body VB). Note that while the first coupling member 63 and the second coupling member 64 are drawn so as to be engaged with each other in FIG. 11 or the like, facing surfaces of individual members may have flat shapes.

The opening direction second piston chamber 61 is configured to be supplied with control oil that presses the second piston 60 in the opening direction of the valve body VB.

The closing direction second piston chamber 62 is configured to press the second piston 60 in the closing direction of the valve body VB. More specifically, the closing direction second piston chamber 62 is provided with a closing spring 65 that presses the second piston 60 in the closing direction of the valve body VB. The second piston 60 is pressed by the biasing force of the closing spring 65 in the closing direction of the valve body VB.

The manifold block 20 in the present embodiment includes the servo valve 23, a first dump valve (corresponding to the dump valve 24 illustrated in FIG. 1), the trip solenoid valve 27, and a second dump valve 66. The accumulator 25 or the blocking valve 26 as illustrated in FIG. 1 or the like, or the supply port-side backflow prevention function valve (supply port-side check valve 32 illustrated in FIG. 1, supply port-side pilot check valve 50 illustrated in FIG. 3, or the supply port-side solenoid valve 51 illustrated in FIG. 5) is not provided.

The control oil in the opening direction first piston chamber 12 is to be discharged via the first dump valve 24.

The control oil in the opening direction second piston chamber 61 is to be discharged via the second dump valve 66. The second dump valve 66 is configured to be switchable between a state blocking the flow of control oil from the opening direction second piston chamber 61 to the discharge port 22 and a state permitting the flow of control oil (to permit or block the flow of the control oil).

More specifically, the second dump valve 66 has a configuration in which the B-port of the second dump valve 66 and the opening direction second piston chamber 61 are connected by the second dump channel 67. The A-port of the second dump valve 66 is connected with the second dump discharge path 68. The second dump discharge path 68 is connected to the discharge port 22 via a first dump discharge path (corresponding to the dump discharge path 41 illustrated in FIG. 1). The X-port (pilot port) of the second dump valve 66 is connected to the B-port of the trip solenoid valve 27.

The second dump valve 66 is controlled by the trip solenoid valve 27. That is, the second dump valve 66 is configured such that, in a state where emergency oil is supplied from the B-port to the X-port of the trip solenoid valve 27, the X-port is pressurized by the emergency oil and closed, blocking the B-port and the A-port of the second dump valve 66. This blocks the flow of control oil from the opening direction second piston chamber 61 to the discharge port 22. In contrast, in a state where the emergency oil is not supplied to the X-port, the second dump valve 66 is opened, allowing communication between the B-port and the A-port of the second dump valve 66. This permits the flow of control oil from the opening direction second piston chamber 61 to the discharge port 22, allowing the control oil to be supplied from the opening direction second piston chamber 61 to the second dump discharge path 68 via the B-port and the A-port of the second dump valve 66. The control oil supplied to the second dump discharge path 68 is then supplied to the discharge port 22 via the first dump discharge path 41 and discharged from the discharge port 22.

The trip discharge path 47 is provided with a second check valve 69. The second check valve 69 is disposed in the trip discharge path 47 on the side closer to the trip solenoid valve 27 rather than to the branch point P5 to which the second dump discharge path 68 is connected. The second check valve 69 is configured to permit the flow of the emergency oil to the branch point P5 and block the flow of the control oil to the trip solenoid valve 27. That is, the second check valve 69 prevents the control oil discharged from the second dump valve 66 from being supplied to the T-port of the trip solenoid valve 27.

In a case where the steam valve SV is opened, as illustrated in FIG. 11, the first electrical signal that is an opening direction electrical command is input to the servo valve 23, and then the control oils is supplied from the supply port 21 to the opening direction first piston chamber 12 via the servo valve 23. The first dump valve 24 is closed because emergency oil is supplied from the trip solenoid valve 27 to the first dump valve 24. Furthermore, the trip solenoid valve 27 is energized, and the control oil (or emergency oil) is supplied from the supply port 21 to the opening direction second piston chamber 61 via the trip solenoid valve 27. On the other hand, an input of the first electrical signal to the servo valve 23 causes the control oil in the closing direction first piston chamber 13 to be discharged from the discharge port 22 via the servo valve 23.

When the control oil is supplied to the opening direction second piston chamber 61, the pressure of the control oil in the opening direction second piston chamber 61 increases. With this configuration, the pressure of the control oil in the opening direction second piston chamber 61 presses the second coupling member 64 of the second piston 60 in the opening direction of the valve body VB. Resisting the biasing force of the closing spring 65, the second coupling member 64 is separated from the first coupling member 63 of the first piston 11. For this reason, while the steam valve SV is open, the second piston 60 is separated from the first piston 11, and the biasing force of the closing spring 65 is not applied as a load to the first piston 11.

When the control oil is supplied to the opening direction first piston chamber 12, the pressure of the control oil in the opening direction first piston chamber 12 increases. When the control oil in the closing direction first piston chamber 13 is discharged, the first piston 11 is pressed in the opening direction of the valve body VB by the pressure of the control oil in the opening direction first piston chamber 12, moving the valve body VB in the opening direction. In this manner, the steam valve SV is opened.

In contrast, in a case where the steam valve SV is rapidly closed, the trip solenoid valve 27 trips as illustrated in FIG. 12. Subsequently, the emergency oil in the X-port of the first dump valve 24 and the emergency oil in the X-port of the second dump valve 66 are discharged, and the first dump valve 24 and the second dump valve 66 will each be opened. Therefore, the control oil in the opening direction first piston chamber 12 is discharged to the discharge port 22 via the first dump discharge path 41. The control oil in the opening direction second piston chamber 61 is discharged to the discharge port 22 via the second dump discharge path 68 and the first dump discharge path 41.

When the control oil in the opening direction second piston chamber 61 is discharged, the second piston 60 moves in the closing direction of the valve body VB by the biasing force of the closing spring 65, and the second coupling member 64 of the second piston comes into contact with the first coupling member 63 of the first piston 11. With this configuration, the biasing force of the closing spring 65 is applied as a load to the first piston 11 via the second piston 60, and the first piston 11 moves together with the second piston 60 in the closing direction of the valve body VB. In the present embodiment, the control oil is supplied to the closing direction first piston chamber 13 via the servo valve 23. With this configuration, the first piston 11 is pressed in the closing direction of the valve body VB by the pressure of the control oil supplied to the closing direction first piston chamber 13, making it possible to increase the force for moving the valve body VB in the closing direction.

In this manner, the valve body VB moves in the closing direction, and the steam valve SV is closed rapidly. At this time, the control oil in the opening direction first piston chamber 12 is discharged from the first dump valve 24 having a large discharge capacity, and together with this, the control oil in the opening direction second piston chamber 61 is discharged from the second dump valve 66 having a large discharge capacity. Accordingly, it is possible to rapidly discharge each of the control oil in the opening direction first piston chamber 12 and the control oil in the opening direction second piston chamber 61. Furthermore, since the closing direction second piston chamber 62 is provided with the closing spring 65, it is possible to rapidly apply, as a load, the biasing force of the closing spring 65 for exerting the fail-safe function to the first piston 11 and the second piston 60. This enables the valve body VB to rapidly move in the closing direction, making it possible to rapidly close the steam valve SV. That is, the fail-safe function can be enhanced.

Moreover, in a case where the power supply of the steam valve driving apparatus 1 is blocked, the trip solenoid valve 27 is de-energized, and the second electrical signal that is an electrical command in the closing direction is input to the servo valve 23. This enables the steam valve SV to be rapidly closed as described above, leading to improvement of the fail-safe function.

In this manner, according to the present embodiment, in the case of rapidly closing the steam valve SV, it is possible to rapidly discharge the control oil in the opening direction first piston chamber 12 to the discharge port 22 via the first dump valve 24. Furthermore, it is also possible to rapidly discharge the control oil in the opening direction second piston chamber 61 to the discharge port 22 via the second dump valve 66. In contrast, since the closing spring 65 is provided in the closing direction second piston chamber 62, the closing spring 65 can press the first piston 11 and the second piston 60 so as to exert a fail-safe function. This makes it possible to rapidly close the steam valve SV by rapidly moving the valve body VB in the closing direction. In contrast, in the case of opening the steam valve SV, it is possible to supply the control oil from the trip solenoid valve 27 to the opening direction second piston chamber 61, enabling an increase in the pressure of the control oil in the opening direction second piston chamber 61. With this configuration, the second piston 60 will be pressed in the opening direction of the valve body VB by the control oil in the opening direction second piston chamber 61, enabling the second piston 60 to be separated from the first piston 11. For this reason, it is possible to prevent the biasing force of the closing spring 65 from being applied as a load to the first piston 11. As a result, in cases other than the case where the steam valve SV is to be rapidly closed, it is possible to prevent the force for exerting the fail-safe function from being applied as a load to the first piston 11. In this case, it is possible to suppress an increase in the volume of the cylinder 10, leading to miniaturization of the cylinder.

Furthermore, according to the present embodiment, it is possible to rapidly close the steam valve SV by the biasing force of the closing spring 65 even when the emergency oil is lost. This makes it possible to further enhance the reliability of the steam valve driving apparatus 1.

Seventh Embodiment

Next, a steam valve driving apparatus according to a seventh embodiment of the present invention will be described with reference to FIGS. 13 and 14.

Figure 13:
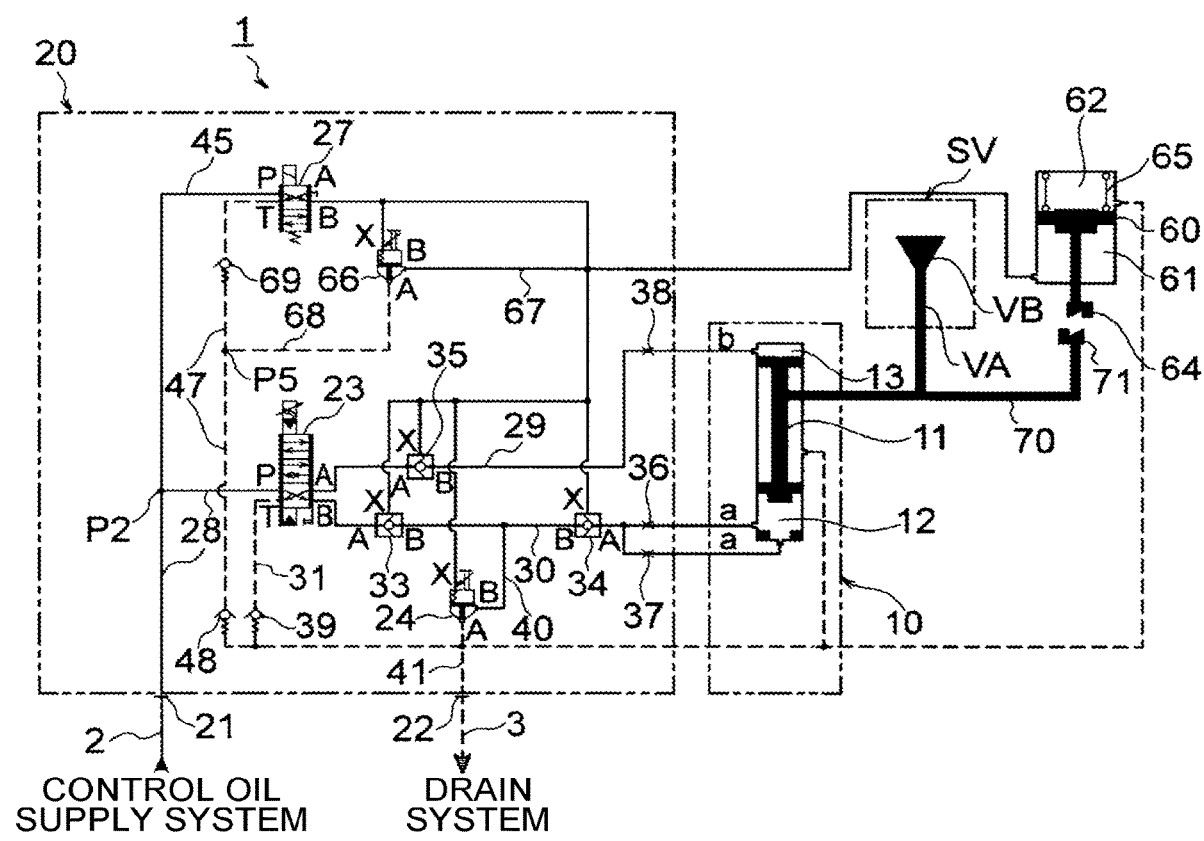
FIG. 13 is a system diagram illustrating a steam valve driving apparatus at the time of resetting the steam valve in a seventh embodiment.
Figure 14:
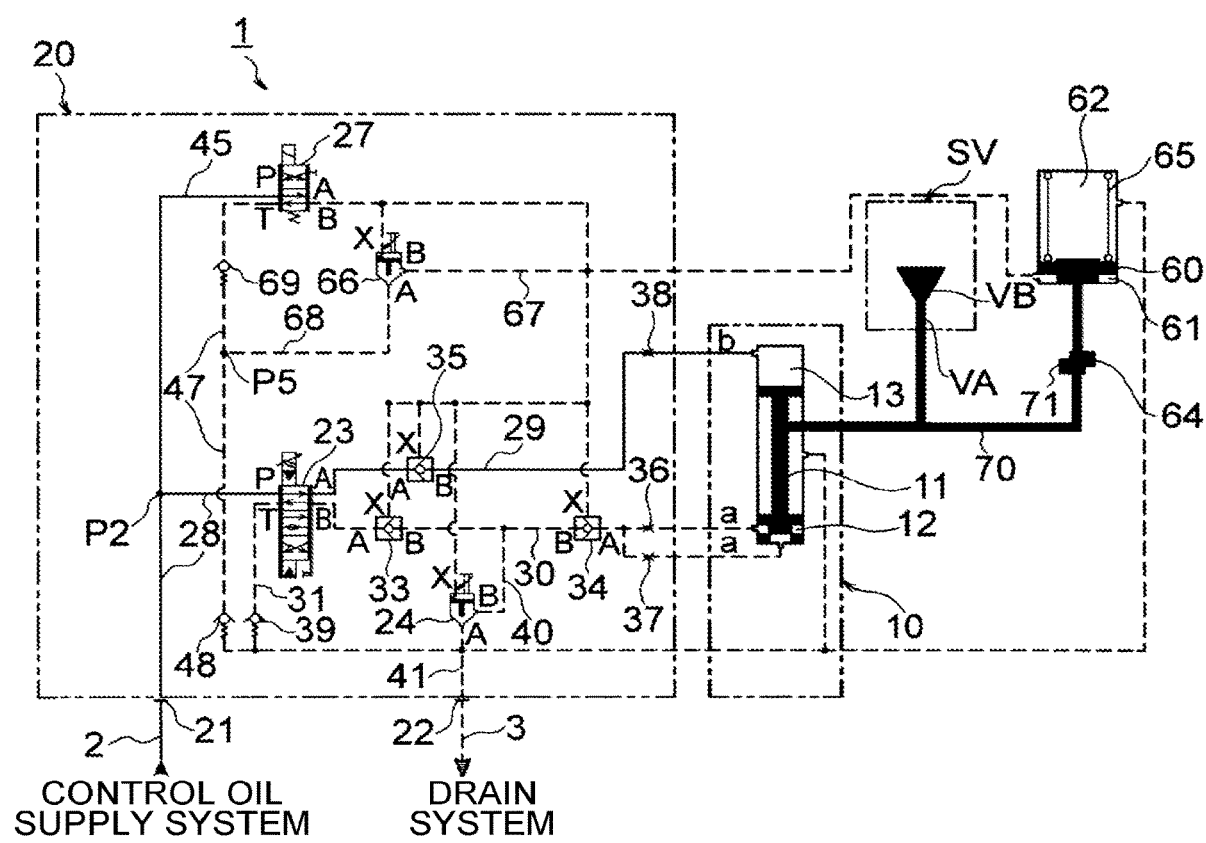
FIG. 14 is a system diagram at the time of trip of the steam valve in the steam valve driving apparatus of FIG. 13.

A main difference of the seventh embodiment illustrated in FIGS. 13 and 14 is that the second piston is joined to the valve body via the joining member not via the first piston in a case where the second piston closes the steam valve. Other configurations are substantially the same as those of the sixth embodiment illustrated in FIGS. 11 and 12. In FIGS. 13 and 14, the same portions as those of the sixth embodiment illustrated in FIGS. 11 and 12 will be denoted by the same reference numerals, and a detailed description thereof will be omitted.

In the present embodiment, as illustrated in FIGS. 13 and 14, in the case of rapidly closing the steam valve SV, the second piston 60 is joined to the valve body VB via a joining member 70, not via the first piston 11. More specifically, as illustrated in FIG. 14, in the case of rapidly closing the steam valve SV, the second coupling member 64 of the second piston 60 is configured to come in contact with the joining member 70 joined to the valve body VB (more specifically, come in contact with a third coupling member 71 provided at a second piston 60-side end of the joining member 70), and thus, the second coupling member 64 is to be joined to the valve body VB (or valve rod VA) via the joining member 70. In contrast, as illustrated in FIG. 13, in the case of opening the steam valve SV, the second coupling member 64 is separated from the third coupling member 71, causing the second piston 60 to be separated from the joining member 70 (that is, the valve body VB).

In this manner, according to the present embodiment, the second piston 60 is to be joined to the joining member 70 joined to the valve body VB, rather than to the first piston 11, in the case of rapidly closing the steam valve SV. This makes it possible to directly transmit the biasing force of the closing spring 65 to the valve body VB. This enables further rapid movement of the valve body VB in the closing direction, enabling the steam valve SV to be closed further rapidly.

Eighth Embodiment

Next, a steam valve driving apparatus according to an eighth embodiment of the present invention will be described with reference to FIGS. 15 and 16.

Figure 15:
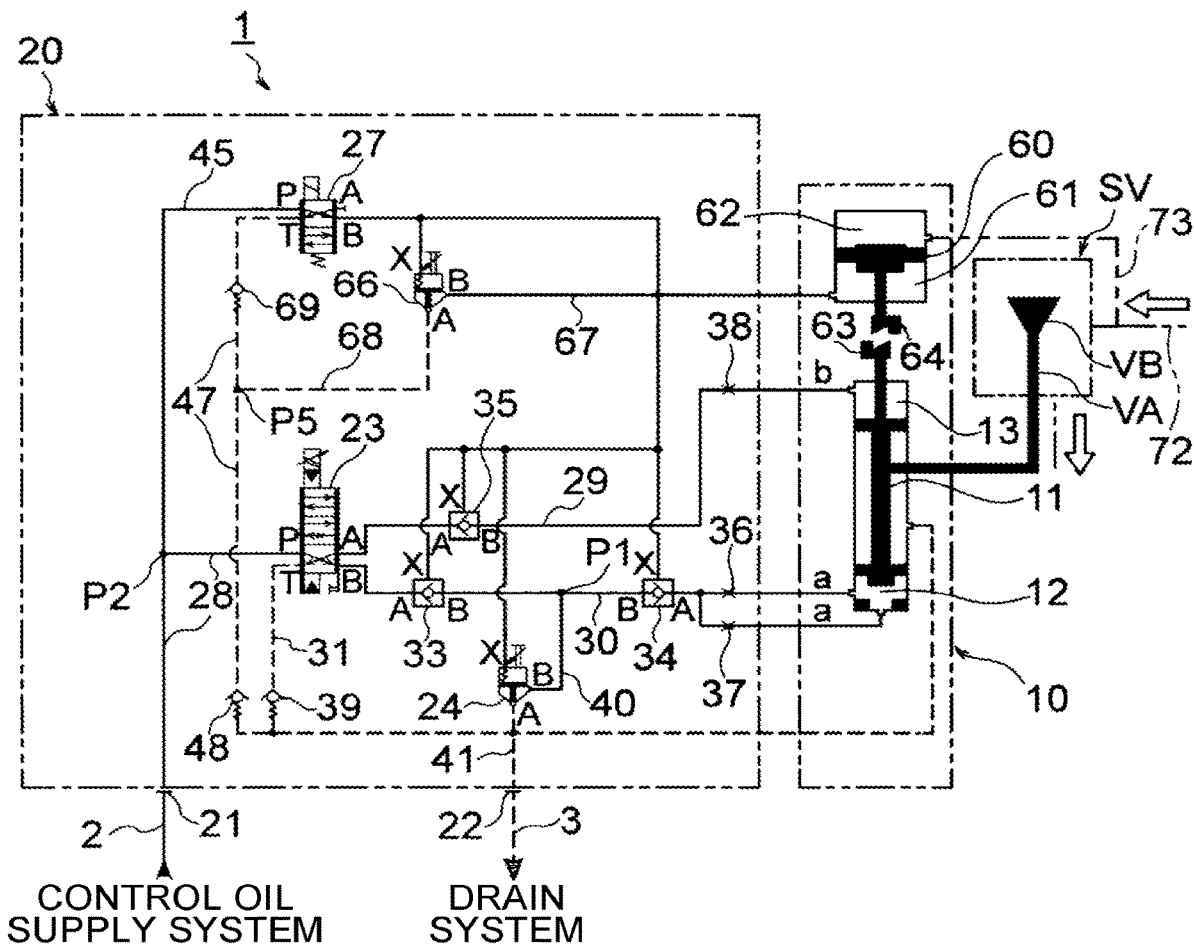
FIG. 15 is a system diagram illustrating a steam valve driving apparatus at the time of resetting the steam valve in an eighth embodiment.
Figure 16:
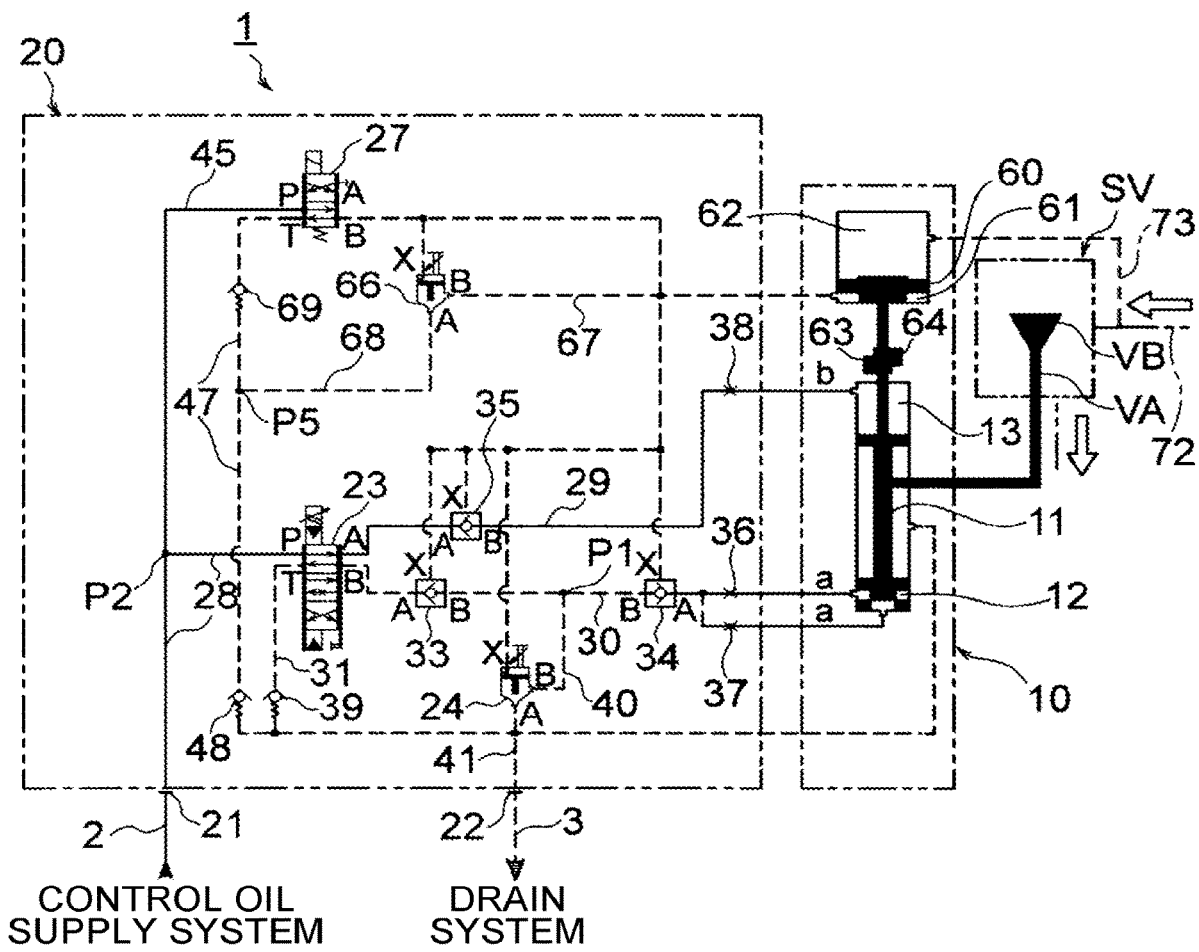
FIG. 16 is a system diagram at the time of trip of the steam valve in the steam valve driving apparatus of FIG. 15.

A main difference of the eighth embodiment illustrated in FIGS. 15 and 16 is that the steam that presses the second piston in the closing direction of the valve body is supplied to the closing direction second piston chamber. Other configurations are substantially the same as those in the sixth embodiment illustrated in FIGS. 11 and 12. In FIGS. 15 and 16, the same portions as those of the sixth embodiment illustrated in FIGS. 11 and 12 will be denoted by the same reference numerals, and a detailed description thereof will be omitted.

In the present embodiment, as illustrated in FIGS. 15 and 16, steam for pressing the second piston 60 in the closing direction of the valve body VB is supplied to the closing direction second piston chamber 62. More specifically, the closing direction second piston chamber 62 is connected to a steam extraction pipe 73 branched from a steam pipe 72 that supplies steam to the steam valve SV. With this configuration, the closing direction second piston chamber 62 is filled with steam, and the pressure in the closing direction second piston chamber 62 increases to the pressure of the steam in the steam pipe 72. With this pressure, the second piston 60 is pressed in the closing direction of the valve body VB. In the present embodiment, the closing direction second piston chamber 62 is not provided with a closing spring 65 that is illustrated in FIG. 11. As illustrated in FIG. 16, in the case of rapidly closing the steam valve SV, the second piston 60 moves in the closing direction due to the pressure of the steam, the second coupling member 64 comes in contact with the first coupling member 63, causing the second piston 60 to be joined to the valve body VB via the first piston 11. In contrast, as illustrated in FIG. 15, in the case of opening the steam valve SV, the second piston 60 moves in the opening direction by the pressure of the control oil supplied to the opening direction second piston chamber 61, and the second coupling member 64 is separated from the first coupling member 63, causing the second piston 60 to be separated from the first piston 11.

In this manner, in the present embodiment, the steam for pressing the second piston 60 in the closing direction of the valve body VB is supplied to the closing direction second piston chamber 62. This makes it possible to obtain the force for exerting the fail-safe function from the steam, leading to a simplified configuration of the steam valve driving apparatus 1.

The above embodiment has described an example in which the second piston 60 is joined to the valve body VB via the first piston 11 in the case of rapidly closing the steam valve SV. However, the present embodiment is not limited to this. The second piston 60 may be joined to the valve body VB not via the first piston 11 in the case of rapidly closing the steam valve SV, as in the configuration illustrated in FIGS. 13 and 14.

Ninth Embodiment

Next, a steam valve driving apparatus according to a ninth embodiment of the present invention will be described with reference to FIGS. 17 to 20.

A main difference of the ninth embodiment illustrated in FIGS. 17 to 20 is that the second piston is provided with a weight member that presses the second piston in the closing direction of the valve body. Other configurations are substantially the same as those in the sixth embodiment illustrated in FIGS. 11 and 12. In FIGS. 17 to 20, the same portions as those of the sixth embodiment illustrated in FIGS. 11 and 12 will be denoted by the same reference numerals, and a detailed description thereof will be omitted.

Figure 17:
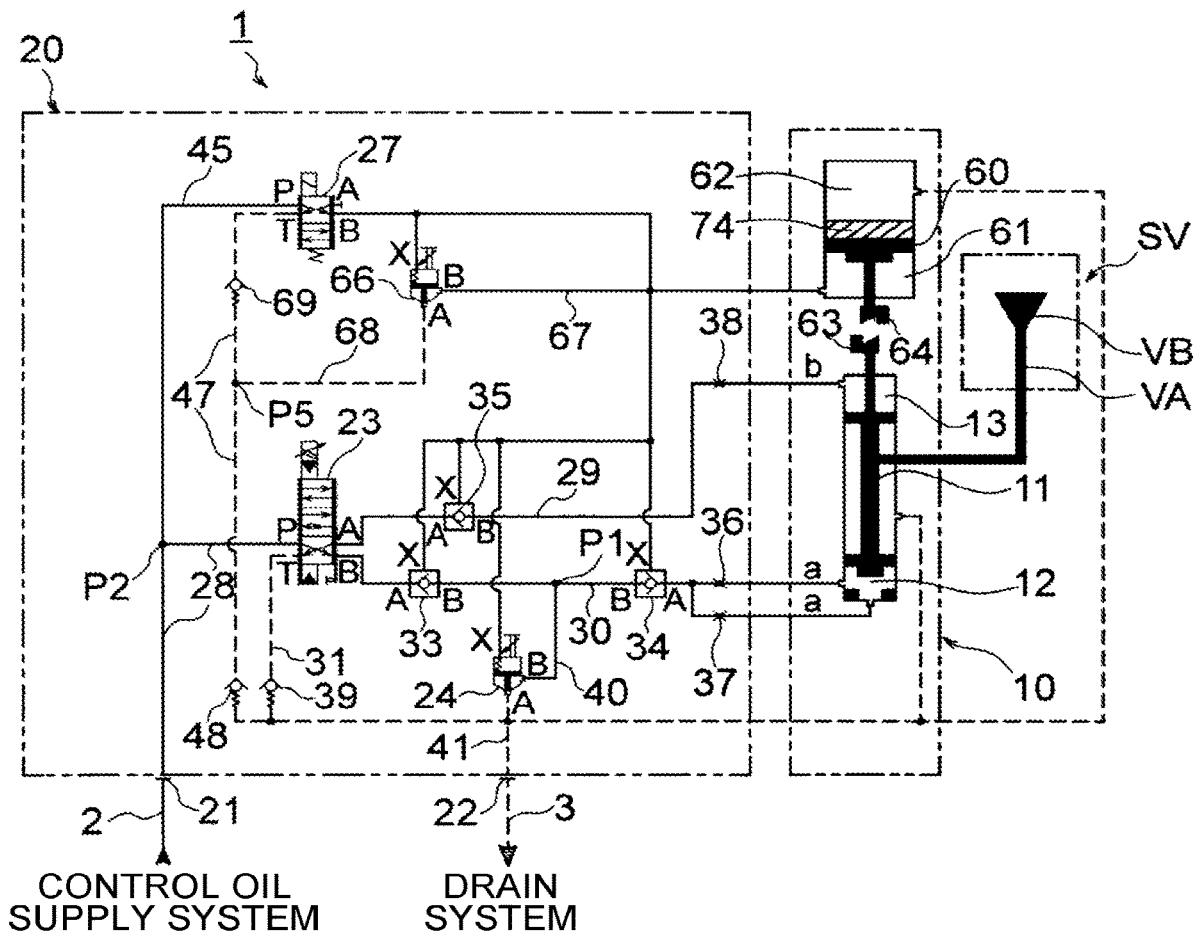
FIG. 17 is a system diagram illustrating a steam valve driving apparatus at the time of resetting the steam valve in a ninth embodiment.
Figure 18:
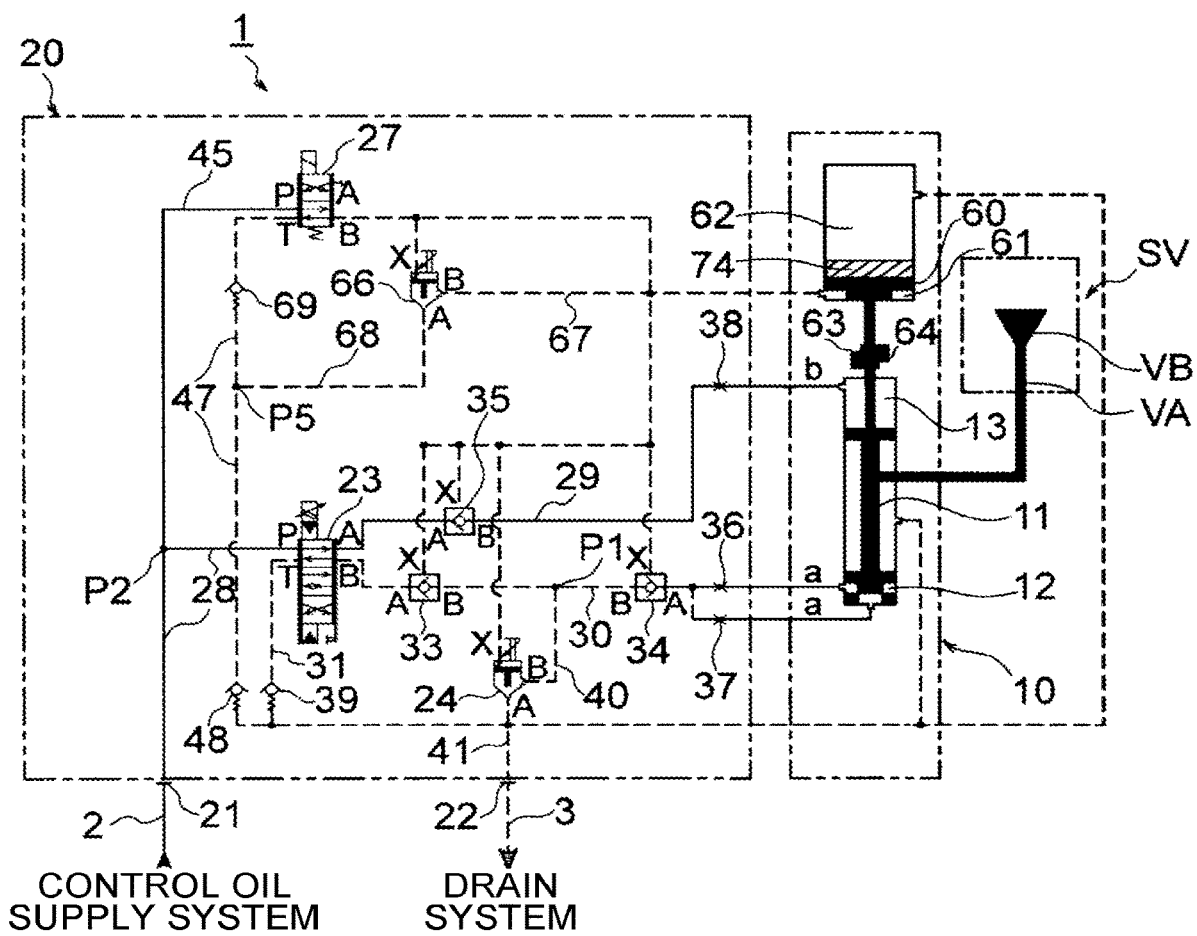
FIG. 18 is a system diagram at the time of trip of the steam valve in the steam valve driving apparatus of FIG. 17.

In the present embodiment, as illustrated in FIGS. 17 and 18, the second piston 60 is provided with a weight member 74 that presses the second piston 60 in the closing direction of the valve body VB. The weight member 74 preferably has a mass that can rapidly close the valve body VB of the steam valve SV. In the present embodiment, the closing direction second piston chamber 62 is not provided with a closing spring 65 that is illustrated in FIG. 11. As illustrated in FIG. 18, in the case of rapidly closing the steam valve SV, the second piston 60 moves in the closing direction due to the weight of the weight member 74, the second coupling member 64 comes in contact with the first coupling member 63, causing the second piston 60 to be joined to the valve body VB via the first piston 11. In contrast, as illustrated in FIG. 17, in the case of opening the steam valve SV, the second piston 60 moves in the opening direction by the pressure of the control oil supplied to the opening direction second piston chamber 61, and the second coupling member 64 is separated from the first coupling member 63, causing the second piston 60 to be separated from the first piston 11.

In this manner, according to the present embodiment, the second piston 60 is provided with the weight member 74 that presses the second piston 60 in the closing direction of the valve body VB. This makes it possible to obtain the force for exerting the fail-safe function from the weight member 74, leading to a simplified configuration of the steam valve driving apparatus 1.

Figure 19:
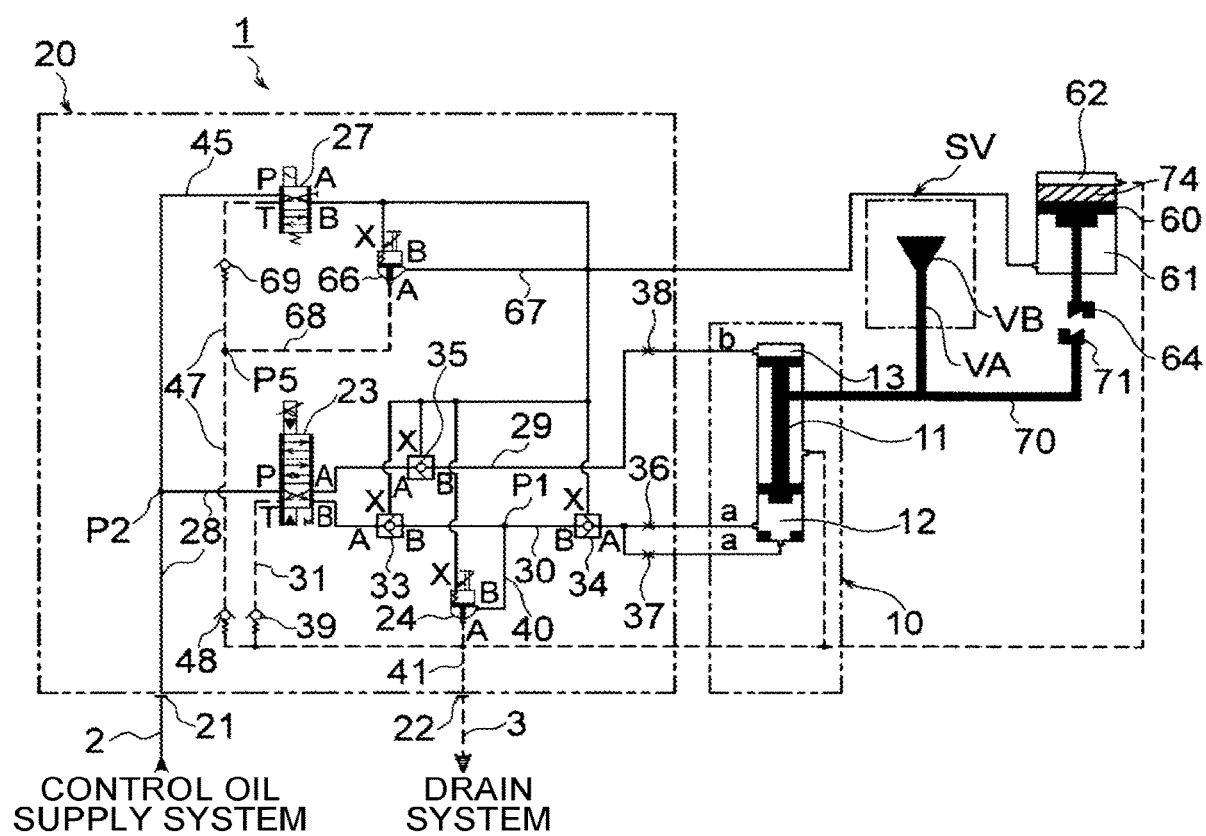
FIG. 19 is a system diagram illustrating a steam valve driving apparatus at the time of resetting the steam valve in a tenth embodiment.
Figure 20:
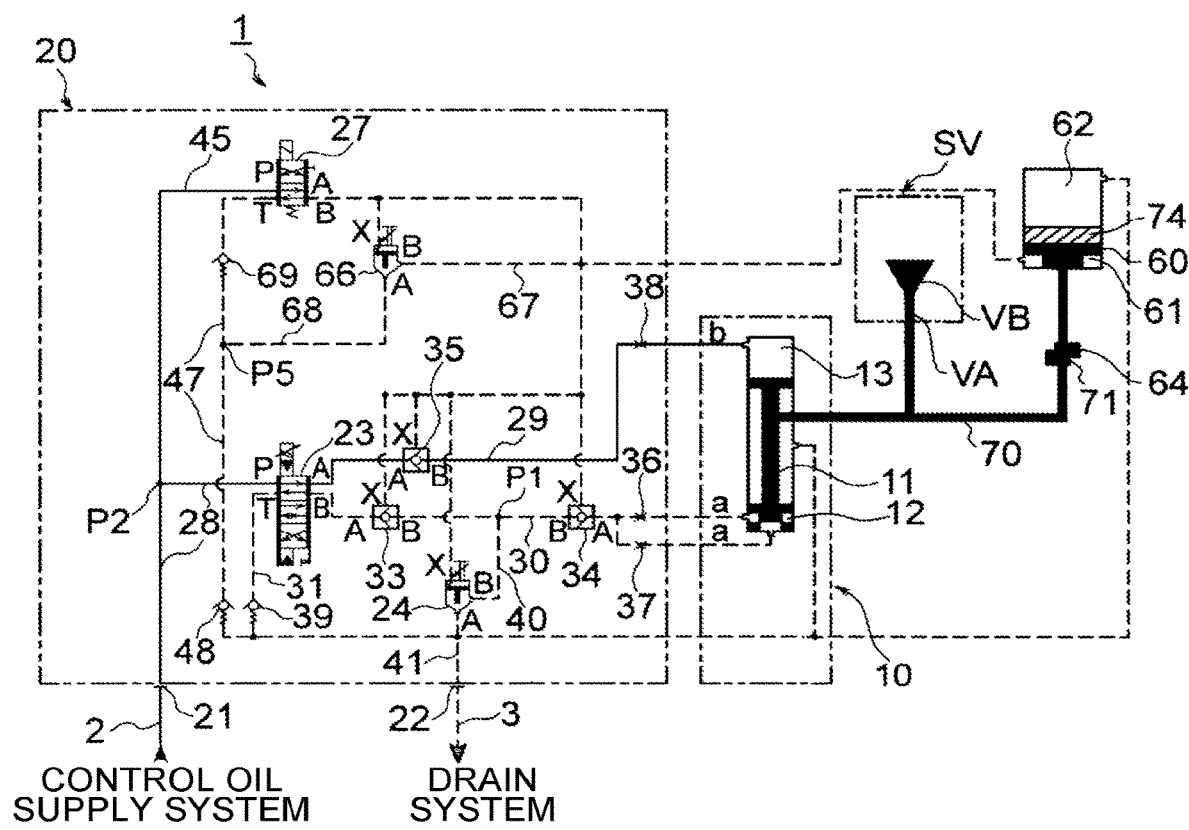
FIG. 20 is a system diagram at the time of trip of the steam valve in the steam valve driving apparatus of FIG. 19.
Figure 21:
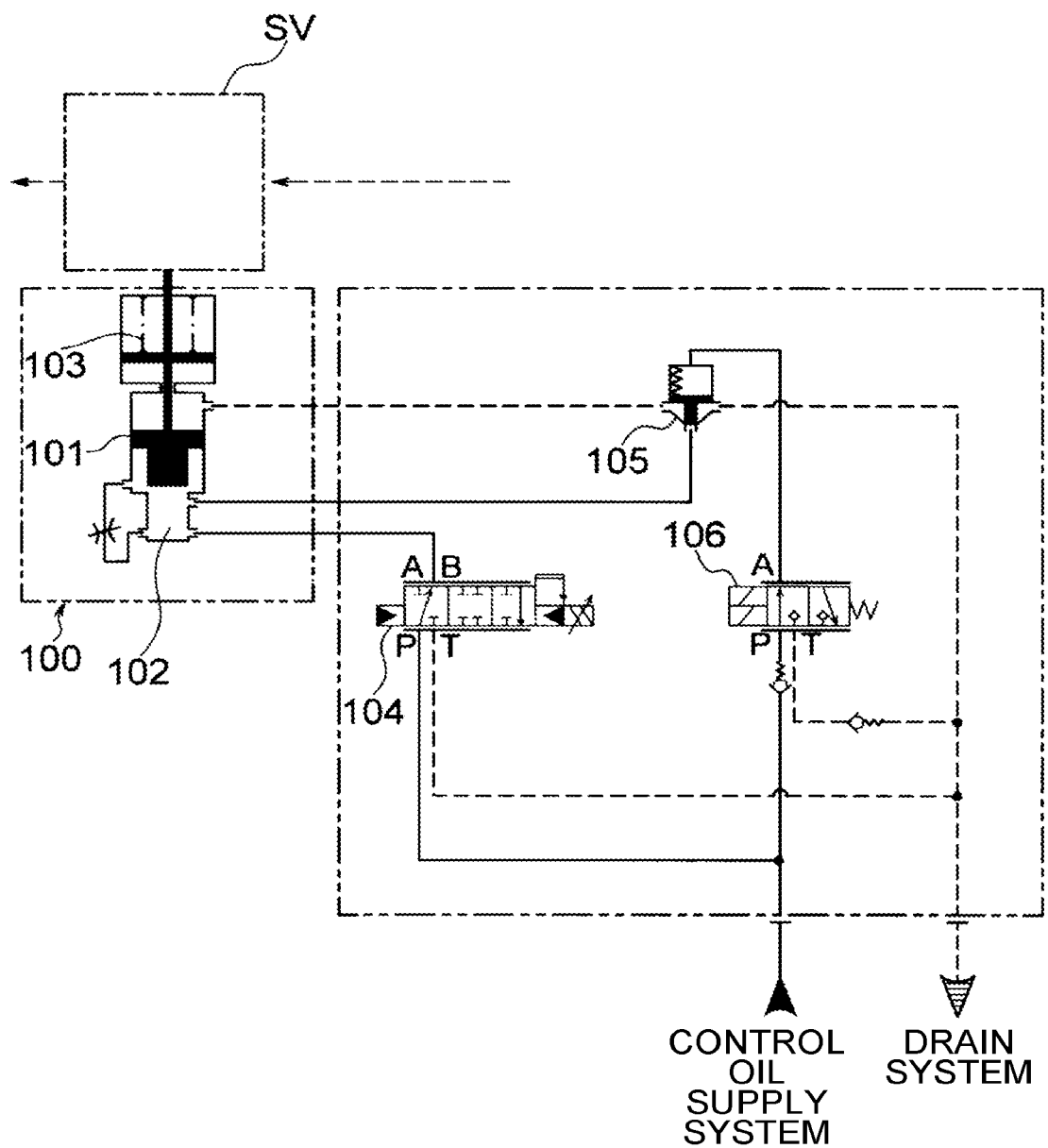
FIG. 21 is a system diagram at the time of resetting a steam valve in a typical steam valve driving apparatus.
Figure 22:
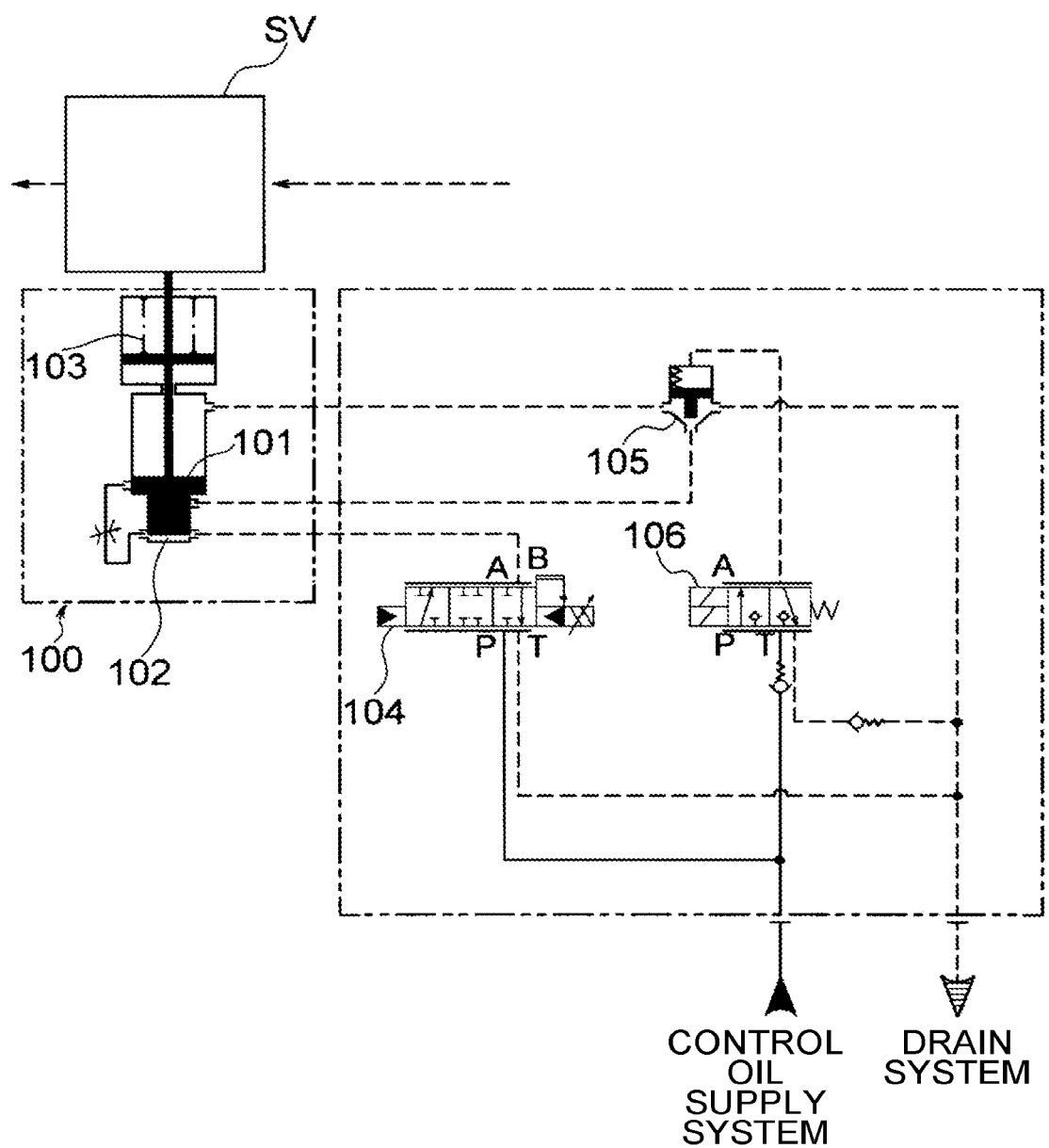
FIG. 22 is a system diagram at the time of trip of the steam valve in the steam valve driving apparatus of FIG. 21.

The above embodiment has described an example in which the second piston 60 is joined to the valve body VB via the first piston 11 in the case of rapidly closing the steam valve SV. However, the present embodiment is not limited to this. The second piston 60 may be joined to the valve body VB via the joining member 70, not via the first piston 11, in the case of rapidly closing the steam valve SV, as in the configuration illustrated in FIGS. 13 and 14. More specifically, as illustrated in FIG. 20, in the case of rapidly closing the steam valve SV, it is allowable to configure such that the second coupling member 64 of the second piston 60 comes in contact with the third coupling member 71 of the joining member 70 joined to the valve body VB, and that the second piston 60 is joined to the valve body VB via the joining member 70. In contrast, as illustrated in FIG. 19, it is allowable to have a configuration in which, in the case of opening the steam valve SV, the second coupling member 64 is separated from the third coupling member 71, causing the second piston 60 to be separated from the joining member 70. In the configuration illustrated in FIGS. 19 and 20, the gravity of the weight member 74 can be directly transmitted to the valve body VB. This enables further rapid movement of the valve body VB in the closing direction, enabling the steam valve SV to be closed further rapidly.

According to the embodiment described above, it is possible to prevent the force for exerting the fail-safe function from being applied as a load to the piston of the cylinder in a case where the steam valve is open.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions. Further, it will be understood that these embodiments can be at least partially combined properly without departing from the spirit of the present invention.

The invention claimed is:

1. A steam valve driving apparatus regulating open and close position of a steam valve, comprising:
    a supply port configured to supply hydraulic oil;
    a discharge port configured to discharge the hydraulic oil;
    a cylinder including a piston joined to the steam valve, an opening direction piston chamber to which the hydraulic oil for pressing the piston in an opening direction of the steam valve is supplied, and a closing direction piston chamber to which the hydraulic oil for pressing the piston in a closing direction of the steam valve is supplied;
    a control valve configured to permit or block a flow of the hydraulic oil from the supply port to the opening direction piston chamber;
    a dump valve configured to block or permit a flow of the hydraulic oil from the opening direction piston chamber to the discharge port;
    an accumulator configured to store the hydraulic oil under pressure;
    a blocking valve configured to permit or block a flow of the hydraulic oil from the accumulator to the closing direction piston chamber; and
    a trip solenoid valve configured to control the dump valve and the blocking valve,
    wherein the control valve configured to permit a flow of a control oil from the closing direction piston chamber to the discharge port in the permission of the hydraulic oil from the supply port to the opening direction piston chamber.

2. The steam valve driving apparatus according to claim 1,
    wherein the trip solenoid valve is switchable between a state in which the flow of the hydraulic oil from the opening direction piston chamber to the discharge port is blocked, and the flow of the hydraulic oil from the accumulator to the closing direction piston chamber is blocked, when the flow of the hydraulic oil is permitted from the supply port to a pilot port of the dump valve and to a pilot port of the blocking valve, and
    a state in which the flow of the hydraulic oil from the opening direction piston chamber to the discharge port is permitted, and that the flow of the hydraulic oil from the accumulator to the closing direction piston chamber is permitted, when the flow of the hydraulic oil is permitted from the pilot port of the dump valve and the pilot port of the blocking valve to the discharge port.

3. The steam valve driving apparatus according to claim 1, further comprising:
    an open-side channel connecting the control valve and the opening direction piston chamber;
    an open-side backflow prevention valve arranged in the open-side channel; and
    a dump channel connecting the dump valve with a halfway position arranged in the open-side channel on the side closer to the opening direction piston chamber rather than to the open-side backflow prevention valve,
    wherein the open-side backflow prevention valve blocks the flow of the hydraulic oil to the control valve.

4. The steam valve driving apparatus according to claim 1, further comprising:
    a first closed-side channel connecting the control valve and the closing direction piston chamber;
    a second closed-side channel connecting the halfway position of the first closed-side channel and the blocking valve; and
    a closed-side backflow prevention valve arranged in the first closed-side channel on the side closer to the control valve rather than to the halfway position at which the second closed-side channel is connected,
    wherein the closed-side backflow prevention valve blocks the flow of the hydraulic oil to the control valve.

5. The steam valve driving apparatus according to claim 4, wherein the closed-side backflow prevention valve is a pilot check valve controlled by the trip solenoid valve.

6. The steam valve driving apparatus according to claim 1, further comprising:
    a hydraulic oil supply path connecting the supply port and the control valve;
    an accumulator filling path that connects the halfway position of the hydraulic oil supply path and the accumulator, and that supplies the hydraulic oil to the accumulator; and
    a supply port-side backflow prevention function valve that is arranged in the hydraulic oil supply channel on the side closer to the supply port rather than to the halfway position at which the accumulator filling path is connected, and that blocks the flow of the hydraulic oil to the supply port.

7. The steam valve driving apparatus according to claim 6, wherein the supply port-side backflow prevention function valve is a pilot check valve controlled by the trip solenoid valve.

8. The steam valve driving apparatus according to claim 6, wherein the supply port-side backflow prevention function valve is a solenoid valve.

9. The steam valve driving apparatus according to claim 1, further comprising:
    an accumulator filling path that connects the trip solenoid valve and the accumulator, and that supplies the hydraulic oil from the trip solenoid valve to the accumulator; and an accumulator-side backflow prevention valve that is arranged in the accumulator filling path and that blocks the flow of the hydraulic oil to the trip solenoid valve.

10. The steam valve driving apparatus according to claim 9, wherein the accumulator-side backflow prevention valve is a pilot check valve controlled by the trip solenoid valve.

11. A steam valve driving apparatus regulating open and close position of a steam valve, comprising:
- a supply port configured to supply hydraulic oil;
- a discharge port configured to discharge the hydraulic oil;
- a cylinder including a first piston joined to the steam valve, an opening direction first piston chamber to which the hydraulic oil that presses the first piston in an opening direction of the steam valve is supplied, and a second piston releasably arranged with respect to the steam valve, an opening direction second piston chamber to which the hydraulic oil that presses the second piston in the opening direction of the steam valve is supplied, and a closing direction second piston chamber that presses the second piston in a closing direction of the steam valve;
- a control valve configured to permit or block a flow of the hydraulic oil from the supply port to the opening direction first piston chamber;
- a first dump valve configured to block or permit a flow of the hydraulic oil from the opening direction first piston chamber to the discharge port;
- a trip solenoid valve configured to permit or block a flow of the hydraulic oil from the supply port to the opening direction second piston chamber; and
- a second dump valve configured to block or permit a flow of the hydraulic oil from the opening direction second piston chamber to the discharge port,
- wherein the second piston is joined to the steam valve in a case of closing the steam valve, and is separated from the steam valve in a case of opening the steam valve.

12. The steam valve driving apparatus according to claim 11,
wherein the second piston is joined to the steam valve via the first piston in the case of closing the steam valve.

13. The steam valve driving apparatus according to claim 11, further comprising a joining member joined to the steam valve,
wherein the second piston is joined to the steam valve via the joining member, not via the first piston, in the case of closing the steam valve.

14. The steam valve driving apparatus according to claim 11, wherein the closing direction second piston chamber is arranged with a closing spring that presses the second piston in the closing direction of the steam valve.

15. The steam valve driving apparatus according to claim 11, wherein steam that presses the second piston in the closing direction of the steam valve is supplied to the closing direction second piston chamber.

16. The steam valve driving apparatus according to claim 11, wherein the second piston is arranged with a weight member that presses the second piston in the closing direction of the steam valve.

* * * * *